US006260101B1

(12) United States Patent
Hansen et al.

(10) Patent No.: US 6,260,101 B1
(45) Date of Patent: *Jul. 10, 2001

(54) MICROCONTROLLER HAVING DEDICATED HARDWARE FOR MEMORY ADDRESS SPACE EXPANSION SUPPORTING BOTH STATIC AND DYNAMIC MEMORY DEVICES

(75) Inventors: John P. Hansen; Ronald M. Huff, both of Austin, TX (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/813,620

(22) Filed: Mar. 7, 1997

(51) Int. Cl.[7] .............................. G06F 12/00; G06F 13/28
(52) U.S. Cl. .................................... 711/5; 710/22; 710/26
(58) Field of Search ................................ 711/5, 104, 101, 711/212, 127, 129, 145, 160, 164, 1, 4, 111, 112, 163; 326/105, 230.02, 3.06; 365/238; 395/842, 846; 710/22, 23, 26, 28

(56) References Cited

U.S. PATENT DOCUMENTS

| | | |
|---|---|---|
| 4,368,515 | 1/1983 | Nielsen . |
| 4,481,580 * | 11/1984 | Martin et al. .......................... 364/200 |
| 4,485,457 | 11/1984 | Balaska et al. . |
| 4,503,491 | 3/1985 | Lushtak et al. . |
| 4,675,808 | 6/1987 | Grinn et al. . |
| 5,249,280 * | 9/1993 | Nash et al. ............................ 395/425 |
| 5,265,231 | 11/1993 | Nuwayser . |
| 5,276,812 | 1/1994 | Yamada et al. . |
| 5,420,995 | 5/1995 | Taguri . |
| 5,530,818 | 6/1996 | Tagawa . |
| 5,535,169 | 7/1996 | Endo et al. . |
| 5,535,419 * | 7/1996 | O'Brien .................................. 395/865 |
| 5,590,078 | 12/1996 | Chatter . |
| 5,590,297 * | 12/1996 | Huck et al. ........................... 395/401 |

(List continued on next page.)

Primary Examiner—Matthew Kim
Assistant Examiner—Matt Anderson
(74) Attorney, Agent, or Firm—Conley, Rose & Tayon, PC

(57) ABSTRACT

A microcontroller is presented including additional hardware which generates additional address signals needed to expand the memory address space of the microcontroller. The additional address signals allow access to memory locations within external memory devices which would not otherwise be accessible while advantageously maintaining software compatibility with previous microcontroller products. The most significant address signals divide memory locations within the external memory devices into multiple memory banks of equal size. The remaining least significant address signals are used to access memory locations within each memory bank. When memory banking is enabled, software instructions select the desired memory bank by writing appropriate values to address bit positions within one or more memory banking registers. In a first embodiment, additional "auxiliary" address signals have values stored within corresponding bit positions of a memory banking control (MBC) register. A second embodiment includes the ability to generate multiplexed address signals for DRAM devices, and to generate the multiplexed address signals such that variably sized DRAM devices are easily accommodated. When address signals are generated which correspond to a portion of the memory address space reserved for operating system software, the additional hardware modifies the additional address signals such that a selected memory bank is always accessed. As a result, operating system software need only be present in the selected memory bank. Elimination of the need to duplicate operating system software in each memory bank mapped to a reserved portion of the memory address space allows efficient utilization of the external memory devices.

25 Claims, 9 Drawing Sheets

U.S. PATENT DOCUMENTS

| | | |
|---|---|---|
| 5,623,638 | 4/1997 | Andrade . |
| 5,710,911 * | 1/1998 | Walsh et al. .......................... 395/555 |
| 5,748,977 | 5/1998 | Kawasaki et al. . |
| 5,749,084 * | 5/1998 | Huck et al. ............................... 711/1 |
| 5,784,291 * | 7/1998 | Chen et al. ........................... 364/491 |
| 5,806,082 * | 9/1998 | Shaw .................................... 711/104 |
| 5,848,258 * | 12/1998 | Fenwick et al. ..................... 395/405 |
| 5,893,932 * | 4/1999 | Dey et al. ............................. 711/211 |
| 5,909,703 | 6/1999 | Hansen et al. . |
| 6,016,537 | 1/2000 | Hansen et al. . |
| 6,023,750 | 2/2000 | Hansen et al. . |

\* cited by examiner

MICROCONTROLLER HAVING DEDICATED HARDWARE FOR MEMORY ADDRESS SPACE EXPANSION SUPPORTING BOTH STATIC AND DYNAMIC MEMORY DEVICES

CROSS-REFERENCE TO RELATED APPLICATION

This application relates to U.S. Pat. No. 6,023,750, filed on the same day as the present application and entitled "MICROCONTROLLER HAVING DEDICATED HARDWARE FOR MEMORY ADDRESS SPACE EXPANSION" by John P. Hansen and Ronald M. Huff, which is incorporated herein by reference.

BACKGROUND OF THE INVENTION

2. Field of the Invention

This invention relates to the manufacture of integrated circuits and more particularly to the manufacture of microcontrollers.

3. Description of the Relevant Art

A microcontroller is an integrated circuit which incorporates a microprocessor core along with one or more support circuits on the same monolithic semiconductor substrate (i.e., chip). A typical computer system includes a microprocessor secured within its own semiconductor device package and connected to several separately-packaged support circuits. The support circuits perform support functions such as communication functions and memory interface functions. Computer systems which employ microcontrollers may thus be formed using fewer semiconductor devices. Advantages of such systems include lower fabrication costs and higher reliabilities. Microcontrollers find applications in industrial and commercial products including control systems, computer terminals, hand-held communications devices (e.g., cellular telephones), photocopier machines, facsimile machines, and hard disk drives.

A microcontroller is typically coupled to one or more external memory devices which store software programs consisting of instructions and data. During operation, the microcontroller fetches the instructions and data from the external memory devices and operates upon the data during instruction execution. The microprocessor core of the microcontroller typically includes an execution unit coupled to a bus interface unit (BIU). The BIU generates multiple address and control signals used to fetch the instructions and data from the external memory devices, and the execution unit executes those instructions. Each unique combination of the address signals generated by the BIU allows access to a different memory location within the external memory devices. For example, if the BIU generates n address signals, the microcontroller may access $2^n$ unique memory locations.

Due to the widespread acceptance of the x86 microprocessor architecture, many microcontrollers include execution units which execute x86 instructions. While newer microcontrollers incorporate an increased number of support circuits, their execution units remain virtually unchanged in order to maintain backwards compatibility with the vast amount of existing software developed for previous microcontroller products.

There are two basic types of software programs: operating system programs and application programs. An operating system is a collection of software programs which provide file management, input/output control, and a controlled environment for executions of applications programs. MS-DOS® and Windows NT™ (Microsoft Corp.) are common operating systems. An application program is a computer program which performs a specific function, and is typically designed to operate within the controlled environment created by an operating system.

Early x86 microprocessors generate 20 address signals A0–A19. The simultaneous values of the address signals A0–A19 define an address, where A0 is the least significant bit of the binary value of the address and A19 is the most significant bit of the binary value of the address. The 20-bit addresses are generated from a 16-bit "segment" portion and a 16-bit "offset" portion. The segment portion is first shifted four bit positions to the left, then the offset portion is added to the shifted segment portion to form the 20-bit address. With 20 address lines, early x86 microprocessors could generate $2^{20}$ (i.e., 1,048,576) unique combinations of address signals and access $2^{20}$ unique memory locations (i.e., 1,048,576 8-bit bytes of memory, or 1 Mbyte of memory). Newer x86 microprocessors still retain this address generation capability in order to maintain software compatibility. The segment portion is stored in one of several dedicated segment registers which software instructions may read and write. The offset portion is typically generated by the execution unit during instruction execution. Microcontrollers based upon the x86 architecture employ this shift-and-add technique to generate 20-bit addresses. The BIU of such microcontrollers typically has special hardware to perform the shift-and-add address generation operation.

The memory address space of a microcontroller generating n address signals extends over $2^n$ consecutive memory locations from memory location 0 to memory location $2^n-1$. For example, the memory address space of a microcontroller having 20 address lines extends from memory location 0 (00000h) to $2^{20}-1$ (i.e., 1,048,575 or FFFFFh). The x86 architecture places certain restrictions upon the contents of memory locations within the memory address space. The x86 architecture reserves portions of the memory address space having the highest and lowest address values for operating system software. A first portion of the memory address having the highest address values (i.e., the uppermost portion of the memory address space) is reserved for software instructions executed following assertion of a RESET signal, system configuration data, and interrupt service routines executed following the reception of interrupt signals. A second portion the memory address space having the lowest address values (i.e., the lowermost portion of the memory address space) is also reserved for operating system software. The first 1,024 bytes of the memory address space (i.e., memory locations 0 through 1,023 or 003FFh) are reserved for an interrupt vector table including 256 4-byte addresses of the entry points of the interrupt service routines corresponding to received interrupt numbers.

Due to the requirement to reserve the uppermost and lowermost portions of the memory address space, microcontrollers employing the x86 architecture typically include a chip select unit (CSU) which generates separate chip select signals for the uppermost and lowermost portions of the memory address space. The CSU typically also generates one or more chip select signals for a middle portion of the memory address space existing between the uppermost and lowermost portions. Only one chip select signal is asserted at any given time, and only memory devices receiving an asserted chip select signal are enabled for the memory access operation in progress. A first non-volatile memory device (e.g., a ROM or a Flash device) typically contains the portion of the operating system software residing in the uppermost portion of the memory address space and receives the corresponding chip select signal. A second volatile memory device (e.g., a RAM device) typically contains the portion of the operating system software allocated to the lowermost portion of the memory address space and receives the corresponding chip select signal. Additional memory devices may contain application programs, and each additional memory device receives a chip select signal designated for the remaining middle portion of the memory address space.

For example, an x86-based microcontroller may be coupled to three different memory devices: a first 256K×8 Flash memory device, a second 256K×8 static random access memory (SRAM) device, and a third 512K×8 SRAM memory device. The first memory device has 18 address signal terminals MA0–MA17 and contains the portion of the operating system software residing in the uppermost portion of the memory address space. Terminals MA0–MA17 of the first memory device are connected to address signal terminals A0–A17 of the microcontroller, and the first memory device is enabled by a programmed upper chip select signal (UCS#). Chip select signal UCS# is an active low signal as denoted by the '#' symbol following the signal name 'UCS'. Active low signals are asserted when driven to a low logic level and deasserted when driven to a logic high level. The second memory device also has 18 address signal terminals MA0–MA17, and contains the portion of the operating system software residing in the lowermost portion of the memory address space. Terminals MA0–MA17 of the second memory device are also connected to address signal terminals A0–A17 of the microcontroller, and the second memory device is enabled by a programmed lower chip select signal (LCS#). The third memory device has 19 address terminals MA0–MA18 and is allocated for applications programs. Terminals MA0–MA18 of the third memory device are connected to address signal terminals A0–A18 of the microcontroller, and the third memory device is enabled by a programmed middle chip select signal (MCS#). The CSU asserts signal UCS# when address values 786,432 (C0000h) through 1,048,575 (FFFFFh) are driven upon the address signal terminals, asserts signal LCS# when address values 0 (00000h) through 262,143 (3FFFFh) are driven upon the address signal terminals, and asserts signal MCS# when address values 262,144 (40000h) through 786,431 (BFFFFh) are driven upon the address signal terminals.

Application programs tend to grow larger with time as new functions are added. In addition, each hardware support function incorporated within a microcontroller typically requires additional instructions for configuration and operation. At the same time, software compatibility requires that the number of address lines and the method of address signal generation remain the same. As a result, increasing the amount of memory accessible by a microcontroller is a problem often requiring unique solutions.

One common solution has been to replace a "smaller" memory device with a "larger" memory devices having a greater number of memory locations and requiring additional address signals. The microcontroller coupled to the larger memory devices generates additional control signals which function as the additional address signals. Special software is used to generate the additional control signals. The additional control signals typically form the most significant address signals, dividing the larger memory device into multiple sections or "banks" of memory. All of the memory banks created in this fashion have the same number of memory locations (i.e., are the same size). The additional control signals select between the available memory banks, determining which of the memory banks is active.

For example, the third memory device in the above example may be replaced by a 1024K×8 memory device having 20 address signal terminals MA0–MA19. If terminals MA0–MA19 of the third memory device were connected to respective address signal terminals A0–A19 of the microcontroller, the portions of the third memory device which overlap the uppermost and lowermost portions of the memory address space (i.e., half the memory locations within the third memory device) would not be accessible as the MCS# signal would not be asserted during memory accesses involving these portions. However, by connecting terminals MA0–MA18 of the third memory device to respective address signal terminals A0–A18 of the microcontroller and connecting an additional control signal generated by the microcontroller to terminal MA19, the microcontroller may access all of the memory locations within the third memory device. This configuration creates two separate memory banks within the third memory device, each memory bank containing 512K memory locations. Special software executed by the microcontroller is used to generate the additional control signal, thereby selecting between the two memory banks.

The requirement of the x86 architecture to reserve portions of the memory address space creates problems when adding memory devices with capacities which exceed the available chip select ranges and contain memory locations with addresses within (i.e., mapped to) reserved portions of the memory address space. In this case, any of the memory banks mapped to a reserved portion of the memory address space may be active when the RESET signal is asserted or when an interrupt occurs. The most straightforward solution to this problem is also the least desirable: duplicate the applicable operating system software in each memory bank. The RESET signal assertion problem may be overcome by ensuring the additional control signals are driven to a logic high level (i.e., a logic 1) when the RESET signal is asserted. However, each memory bank mapped to the lowermost portion of the memory address space must contain a copy of the 1,024-byte interrupt vector table, and each memory bank mapped to the uppermost portion of the memory address space must include interrupt service routines which are either complete or include enough instructions to switch to a "common" memory bank containing the interrupt service routines.

For example, assume an x86-based microcontroller is coupled to two different memory devices: a first 256K×8 Flash memory device and a second 1,024×8 SRAM memory device. The first memory device has 18 address terminals MA0–MA17 and contains the portion of the operating system software residing in the uppermost portion of the memory address space. Terminals MA0–MA17 of the first memory device are connected to respective address signal terminals A0–A17 of the microcontroller, and the first memory device is enabled by a programmed upper chip select signal (UCS#). The second memory device has 20 address terminals MA0–MA19, and contains the portion of the operating system software residing in the lowermost portion of the memory address space. The remainder of the second memory device is available for application programs.

In order for the microcontroller to access all of the memory locations within the second memory device, terminals MA0–MA18 of the second memory device are connected to respective address signal terminals A0–A18 of the microcontroller, the microcontroller generates an additional control signal connected to terminal MA19, and the second memory device is enabled by a programmed lower chip select signal (LCS#). The CSU asserts signal UCS# when address values 786,432 (C0000h) through 1,048,575 (FFFFFh) are driven upon the address signal terminals, and asserts signal LCS# when address values 0 (00000h) through 524,287 (7FFFFh) are driven upon the address signal terminals. The second memory device contains two memory banks each containing 512K memory locations mapped between address values 0 (00000h) and 524,287 (7FFFFh). Special software executed by the microcontroller generates the additional control signal, thereby selecting between the two memory banks. However, as a result of the requirement of the x86 architecture to reserve portions of the memory address space, both memory banks must contain a copy of the 1,024-byte interrupt vector table in memory locations corresponding to address values 0 (00000h) through 1,023 (003FFh).

Dynamic random access memory (DRAM) devices, offering comparatively large numbers of memory locations in small packages at low costs, are commonly used in computer systems. DRAM devices employ address signal multiplexing in order to reduce the number of required address pins. While non-DRAM (e.g., SRAM devices and Flash memory devices) typically have $\log_2(n)$ address signal terminals (i.e., pins), where n is the number of memory locations within the device, DRAM devices have a much smaller number of address pins. Addresses of memory locations within DRAM devices are typically divided into two portions of nearly equal length. A first portion of the address is made up of the most significant bits of the address and is called the row address. The remaining portion is called the column address. During a memory access operation involving a DRAM device, the row address is first conveyed to the address pins, and a row address strobe (RAS#) signal is asserted to store the row address within the DRAM device. The column address is then conveyed to the address pins, and a column address strobe (CAS#) signal is asserted to store the column address within the DRAM device. If the memory access operation is a read operation, the contents of the accessed memory location are driven upon one or more data pins of the DRAM device. If the memory access operation is a write operation, logic values present upon the data pins are stored within the accessed memory location. Computer systems employing DRAM devices typically include a memory controller which generates the multiplexed address signals and the control signals required by the DRAM devices.

It would be beneficial to have a microcontroller which includes additional hardware to generate address signals which provide for memory banking. When access to operating system software is desired, the address signals select a single memory bank containing the operating system software. Such a microcontroller would eliminate the need to duplicate operating system software in each memory bank mapped to a reserved portion of the memory address space, allowing efficient utilization of larger memory devices. Furthermore, it would be beneficial for the additional hardware to produce the address signals in a multiplexed fashion along with the control signals required by DRAM devices such that both non-DRAM devices (e.g., SRAM devices or Flash memory devices) and DRAM devices may be coupled to the microcontroller. It would also be beneficial for the microcontroller to achieve the above while maintaining software compatibility with previous microcontroller products.

SUMMARY OF THE INVENTION

The problems outlined above are in large part solved by a microcontroller which includes additional hardware which generates additional address signals needed to expand the memory address space of the microcontroller. The additional address signals are generated such that they allow access to memory locations within external memory devices which would not otherwise be accessible while advantageously maintaining software compatibility with previous microcontroller products. The most significant address signals serve to divide memory locations within the external memory devices into multiple memory banks of equal size. When memory banking is enabled, software instructions select the desired memory bank by writing appropriate values to address bit positions within one or more memory banking registers. The most significant address signals are normally produced having values stored within corresponding bit positions of the one or more memory banking registers. When internal address signals are generated which correspond to a portion of the memory address space reserved for operating system software, however, the additional hardware modifies the most significant address signals such that a selected memory bank is always accessed. As a result, operating system software need only be present in the selected memory bank. This method of generating the address signals eliminates the need to duplicate operating system software in each memory bank mapped to a reserved portion of the memory address space, allowing efficient utilization of the external memory devices.

A first embodiment of the microcontroller includes an auxiliary address generator (AAG) which generates multiple additional address signals called "auxiliary" address signals. The auxiliary address signals are combined with "normal" address signals to form augmented address signals. The auxiliary address signals form the most significant of the augmented address signals, and are used to divide memory locations within external memory devices into multiple memory banks of equal size. A second embodiment of the microcontroller includes a memory control unit (MCU) which generates address and control signals needed to access both DRAM devices and non-DRAM devices (e.g., SRAM devices and Flash memory devices). The MCU includes the ability to generate multiplexed address signals for DRAM devices. The multiplexed address signals are generated such that DRAM devices of varying sizes are easily accommodated.

The first embodiment of the microcontroller also includes an execution unit, a bus interface unit (BIU), and a chip select unit (CSU) all coupled to signal lines of a core bus. The execution unit is configured to execute microprocessor instructions, preferably instructions from an x86 instruction set. The BIU includes multiple data buffers and handles all data transfer operations between the microcontroller and one or more external devices coupled to the microcontroller (e.g., memory devices and I/O devices) in accordance with established protocols. During the execution of microprocessor instructions, the execution unit generates output data which represent offset portions of addresses of memory locations from which data is to be read or to which data is to be written. The BIU receives the offset portion of the address via the core bus and combines the offset portion with a segment portion in order to produce multiple internal address signals corresponding to the address. The CSU receives the BIU address signals via the core bus and uses the BIU address signals to generate several different chip select signals. Each chip select signal is associated with a programmable range of addresses. The CSU asserts a chip select signal when the BIU address signals define an address within the corresponding range of addresses.

The auxiliary address signals generated by the AAG are used along with the BIU address signals to access memory locations within one or more external memory devices. Each added auxiliary address signal doubles the number of memory locations which may be accessed within an external memory device using the BIU address signals alone. The auxiliary address signals are used to select a memory bank, and the BIU address signals are used to access the memory locations within the selected memory bank. A subset of the auxiliary address signals may be associated with the uppermost portion of the memory address space, and the remaining auxiliary address signals are associated with the lowermost portion of the memory address space.

When memory banking is enabled, the AAG produces the auxiliary address signals having values stored within corresponding address bit positions of the MBC register. When address signals are generated which correspond to a portion of the memory address space reserved for operating system software, however, the AAG ignores the address bit positions within the MBC register and produces auxiliary address signals having predetermined values. As a result, a selected memory bank within an external memory device is always accessed when address signals are generated which correspond to a portion of the memory address space reserved for operating system software.

The CSU generates two chip select signals associated with an uppermost portion of the memory address space of the microcontroller: UCS0# and UCS1#. Chip select signal UCS1# is terminated at an I/O pad and is used to enable an external memory device. Chip select signal UCS0# is routed to the AAG. The CSU asserts chip select signal UCS0# when an address within the uppermost portion of the memory address space reserved for operating system software is generated. The AAG uses chip select signal UCS0# to generate the auxiliary address signals associated with the uppermost portion of the memory address space. For example, when memory banking is enabled and chip select signal UCS0# is asserted, the AAG ignores the address bits within the MBC register and produces the auxiliary address bits associated with the uppermost portion of the memory address space with predetermined values. For example, when memory banking is enabled and chip select signal UCS0# is asserted, the AAG may produce the auxiliary address bits associated with the uppermost portion of the memory address space with values of 1. As a result, only a selected memory bank within an external memory device is accessed when an address within the uppermost portion of the memory address space reserved for operating system software is generated by the BIU.

The CSU also generates two chip select signals associated with a lowermost portion of the memory address space of the microcontroller: LCS0# and LCS1#. Chip select signal LCS1# is terminated at an I/O pad and is used to enable an external memory device. Chip select signal LCS0# is routed to the AAG. The CSU asserts chip select signal LCS0# when an address within the lowermost portion of the memory address space reserved for operating system software is generated. The AAG uses chip select signal LCS0# to generate the auxiliary address signals associated with the lowermost portion of the memory address space. For example, when memory banking is enabled and chip select signal LCS0# is asserted, the AAG ignores the address bits within the MBC register and produces the auxiliary address bits associated with the lowermost portion of the memory address space with predetermined values. For example, when memory banking is enabled and chip select signal LCS0# is asserted, the AAG may produce the auxiliary address bits associated with the lowermost portion of the memory address space with values of 0. As a result, only a selected memory bank within an external memory device is accessed when an address within the lowermost portion of the memory address space reserved for operating system software is generated by the BIU.

In the second embodiment of the microcontroller, the execution unit, the BIU, and the CSU are coupled to the core bus along with a DMA unit and the MCU. The DMA unit is used to transfer data between two different address ranges within the memory address space of the microcontroller without involving the execution unit. The MCU generates address and control signals needed to store data within and retrieve data from one or more external memory devices coupled to the microcontroller. The external memory devices may be, for example, SRAM devices, DRAM devices, or Flash memory devices. The MCU includes circuitry required to generate multiplexed address signals and the control signals required to access memory locations within DRAM devices.

In the second embodiment, the BIU generates m internal address signals IA0–IAm−1 during data transfer operations, where m is preferably the number of address signals produced by a previous microcontroller product such that software compatibility with the previous microcontroller is maintained. The BIU combines an address offset portion produced by the execution unit with a segment portion to produce an m-bit internal address as described above. The CSU receives the internal address signals via the core bus and uses the internal address signals, along with the contents of several programmable chip select registers to generate chip select signals UCS0#, UCS1#, LCS0#, and LCS1#.

The MCU receives the internal address signals generated by the BIU, and also receives m DMA address signals DA0–DAm−1 generated by the DMA unit via the core bus. In order to maintain software compatibility with the previous microcontroller product, MCU 66 uses the internal address signals, the DMA address signals, chip select signals UCS0#, UCS1#, LCS0#, and LCS1#, and the contents of several programmable memory banking registers to generate m+n address signals, where $n \leq 2$. The most significant address signals divide memory locations within an external memory device receiving the address signals into multiple memory banks of equal size as described above.

Each memory banking register includes an address bit enable field bit and several address bit positions. Each address bit position corresponds to an address signal generated by the MCU, and contains the value of the corresponding address signal to be generated. The contents of the address bit enable field determine which of the address bit positions are active (i.e., used by the MCU to generate corresponding address signals).

When a larger DRAM device is coupled to a microcontroller, different address signals must typically be conveyed to the address pins of the DRAM device during each portion of the memory access operation. Accommodation of the larger DRAM device typically requires hardware/software reconfiguration to generate the correct address signals during the correct portions of the memory access operation. In addition, the signal lines connecting address pins of the microcontroller to address pins of the larger DRAM device must be rerouted.

The MCU of the second embodiment, however, generates multiplexed address signals such that DRAM devices of varying sizes are supported with a minimum amount of reconfiguration. The MCU accomplishes this by generating address signals corresponding to alternating even-numbered (or odd-numbered) address bits during the first portion of a data transfer operation, and generating address signals corresponding to the remaining alternating odd-numbered (or even-numbered) address bits during the second portion of a data transfer operation. This allows the microcontroller to accommodate DRAM devices of varying sizes without the need to modify address signal generation or reroute address signal lines. A larger DRAM device is accommodated by simply coupling additional address signals to the additional address pins of the larger DRAM device. The generation and routing of existing address signals does not change. A smaller DRAM device is accommodated by simply decoupling address signals no longer needed.

BRIEF DESCRIPTION OF THE DRAWINGS

Other objects and advantages of the invention will become apparent upon reading the following detailed description and upon reference to the accompanying drawings in which.

Figure 1:
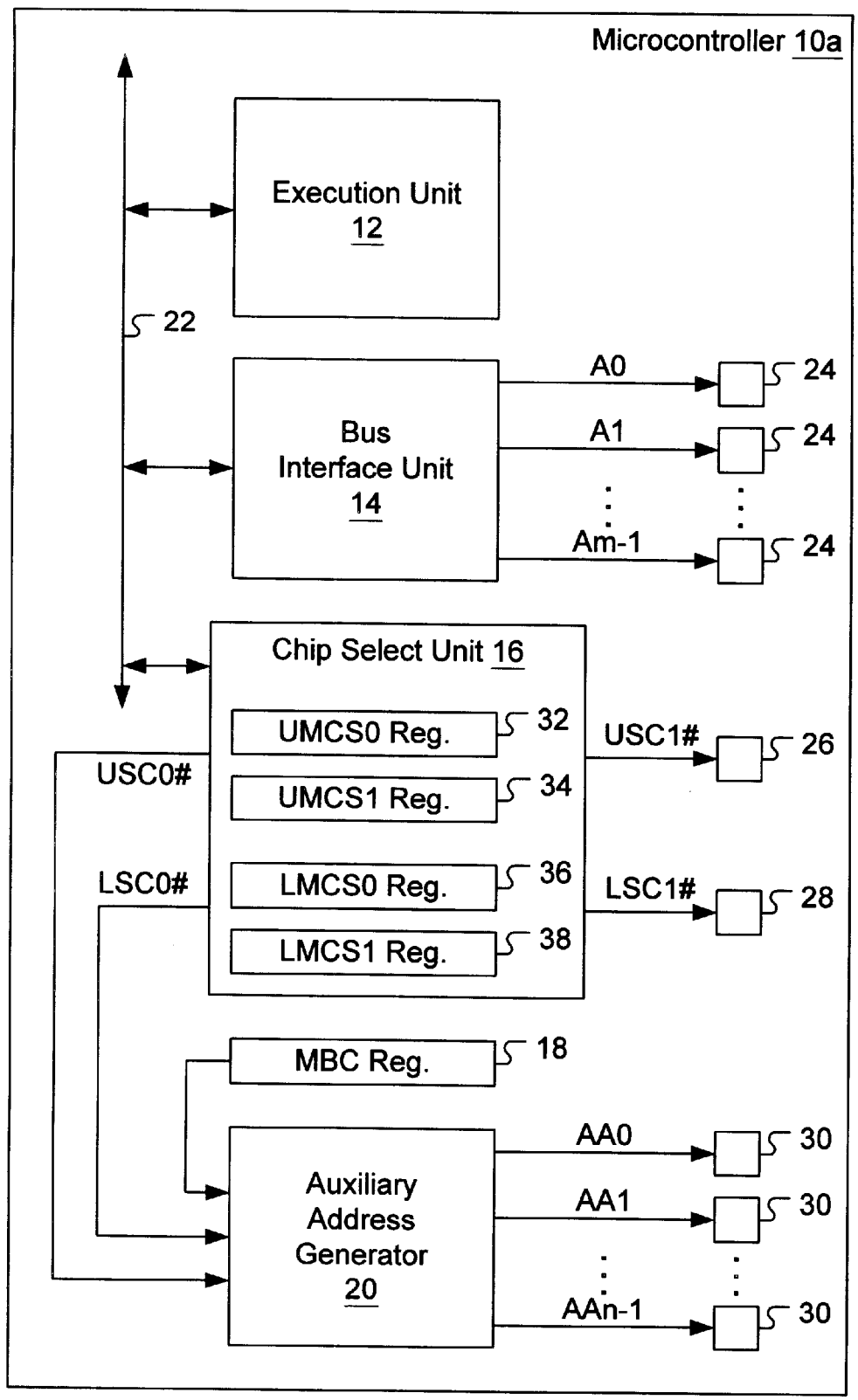
FIG. 1 is a block diagram of a first embodiment of a microcontroller of the present invention, wherein the microcontroller includes an execution unit, a bus interface unit (BIU), a chip select unit (CSU), a memory banking control (MBC) register, and an auxiliary address generator (AAG)

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 is a block diagram of a microcontroller 10a, wherein microcontroller 10a is a first embodiment of a microcontroller 10 of the present invention. Microcontroller 10a includes an execution unit 12, a bus interface unit (BIU) 14, a chip select unit (CSU) 16, a memory banking control (MBC) register 18, an auxiliary address generator (AAG) 20, a core bus 22, a first set of I/O pads 24, a first I/O pad 26, a second I/O pad 28, and a second set of I/O pads 30, all formed upon a single monolithic semiconductor substrate (i.e., chip). Execution unit 12 executes microprocessor instructions, preferably from an instruction set of an x86 microprocessor. BIU 14 includes multiple data buffers and performs data transfer operations between microcontroller 10 and external devices coupled to microcontroller 10 (e.g., memory devices and I/O devices) in accordance with established protocols. BIU 14 generates m address signals A0–Am−1 during data transfer operations. CSU 16 uses the address signals generated by BIU 14 to generate chip select signals which enable external memory devices during data transfer operations. Core bus 22 includes multiple signal lines. Execution unit 12, BIU 14, and CSU 16 are coupled to core bus 22 and communicate with one another via signals driven upon the signal lines of core bus 22.

During manufacture of microcontroller 10, signal lines to be connected to external devices are terminated at flat metal contact regions (i.e., I/O pads) located upon an exposed surface of the chip. Following manufacture, microcontroller 10 is typically secured within a protective semiconductor device package. Each I/O pad is then connected to a terminal (i.e., pin) of the device package by a signal line (i.e., a wire).

During the execution of microprocessor instructions, execution unit 12 generates output data which represent offset portions of addresses of memory locations from which data is to be read or to which data is to be written. BIU 14 receives the offset portion of the address, combines it with a segment portion, and produces address signals A0–Am−1. The segment portion is typically stored in one of several segment registers within the BIU. Each address signal A0–Am−1 is driven upon a corresponding member of the first set of I/O pads 24. The simultaneous values of address signals A0–Am−1 determine an address of a memory location within an external memory device, and all possible combinations of simultaneous values of address signals A0–Am−1 determine the memory address space of microcontroller 10.

BIU 14 also drives address signals A0–Am−1 upon signals lines of core bus 22. CSU 16 receives address signals A0–Am−1 via core bus 22 and uses the address signals to generate several different chip select signals. Each chip select signal is associated with a programmable range of addresses. CSU 16 asserts a chip select signal when address signals A0–Am−1 define an address within the corresponding range of addresses.

CSU 16 includes an upper memory chip select 0 (UMCS0) register 32, an upper memory chip select 1 (UMCS1) register 34, a lower memory chip select 0 (LMCS0) register 36, and a lower memory chip select 1 (LMCS1) register 38. UMCS0 register 32, UMCS1 register 34, LMCS0 register 36, and LMCS1 register 38 are programmable registers, meaning software instructions may change the contents of any one of these registers by writing a value to an address associated with the target register. CSU 16 uses address range information stored within UMCS0 register 32 to generate an active low upper memory chip select 0 (UCS0#) signal, address range information stored within UMCS1 register 34 to generate an active low upper memory chip select 1 (UCS14) signal, address range information stored within LMCS0 register 36 to generate an active low lower memory chip select 0 (LCS0#) signal, and address range information stored within LMCS1 register 38 to generate an active low lower memory chip select 1 (LCS1#) signal. Chip select signals UCS1# and LCS1# are driven upon respective first I/O pad 26 and second I/O pad 28.

Address range information stored within UMCS0 register 32 defines an uppermost portion of the memory address space reserved for operating system software, and address range information stored within LMCS0 register 36 defines a lowermost portion of the memory address space reserved for operating system software. CSU 16 thus asserts signal UCS0# when address signals A0–Am−1 correspond to an address within the uppermost portion of the memory address space reserved for operating system software. Similarly, CSU 16 asserts signal LCS0# when address signals A0–Am−1 correspond to an address within the lowermost portion of the memory address space reserved for operating system software.

AAG 20 uses chip select signals UCS0# and LCS0# along with the contents of MBC register 18 to produce n auxiliary address signals AA0–AAn−1, where n≦2. MBC register 18 includes bit positions for storing desired values of corresponding auxiliary address signals (i.e., 0 or 1). Each auxiliary address signal AA0–AAn−1 is driven upon a corresponding member of the second set of I/O pads 30. Auxiliary address signals AA0–AAn−1 are added to address signals A0–Am−1 generated by BIU 14 to form augmented addresses within augmented memory address spaces. Each added auxiliary address signal doubles the number of memory locations which may be accessed using address signals A0–Am−1 alone. One or more auxiliary address signals are used to form the most significant bits of an augmented address. Auxiliary address signals AA0–AAn−1 divide memory locations within an external memory device receiving the address signals into multiple memory banks having equal numbers of memory locations (i.e., of equal size), and address signals A0–Am−1 are used to access the memory locations within each memory bank.

AAG 20 generates auxiliary address signals AA0–AAn−1 such that when BIU 14 generates address signals A0–Am−1 corresponding to a portion of the memory address space reserved for operating system software, the augmented address accesses only one of the multiple memory banks. AAG 20 thus eliminates the need to duplicate operating system software in each memory bank mapped to a portion of the memory address space reserved for operating system software, allowing larger memory devices having a greater number of memory locations to be used efficiently.

Figure 2:
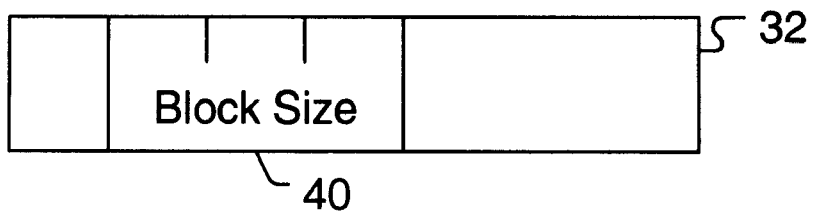
FIG. 2 is a block diagram of a preferred embodiment of a UMCS0 register within the CSU of FIG. 1, wherein the UMCS0 register includes a block size field for storing address range information relating to an uppermost portion of the microcontroller memory address space reserved for operating system software.

FIG. 2 is a block diagram of a preferred embodiment of UMCS0 register 32. UMCS0 register 32 includes a block size field 40 occupying three contiguous bit positions of UMCS0 register 32. Block size field 40 defines a portion of the memory address space of microcontroller 10 extending from the highest address value (i.e., all address signals A0–Am−1 having a value of 1) down to a lower boundary defined by the size of a memory block. Table 1 below shows preferred block size field 40 encoding information for a microcontroller generating 20 address signals A0–A19 and having a corresponding 1 Mbyte memory address space.

TABLE 1

UMCS0 Block Size Field Programming Values.

| Block Size Field Contents | Memory Block Size | Corresponding Lower Boundary |
|---|---|---|
| 000 | 512K | 80000h |
| 001 | (Reserved) | |
| 010 | (Reserved) | |
| 011 | (Reserved) | |
| 100 | 256K | C0000h |
| 101 | (Reserved) | |
| 110 | 168K | E0000h |

Figure 3:
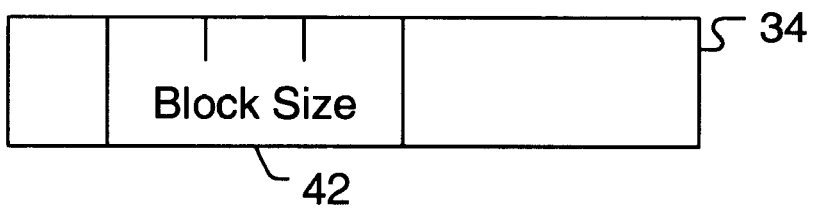
FIG. 3 is a block diagram of a preferred embodiment of a UMCS1 register within the CSU of FIG. 1, wherein the UMCS1 register includes a block size field for storing address range information relating to memory locations within an external memory device coupled to the microcontroller and mapped to the uppermost portion of the microcontroller memory address space.

FIG. 3 is a block diagram of a preferred embodiment of UMCS1 register 34. UMCS1 register 34 includes a block size field 42 occupying three contiguous bit positions of UMCS1 register 34. Block size field 42 defines a portion of the memory address space of microcontroller 10 extending from the highest address value (i.e., all address signals A0–Am−1 having a value of 1) down to a lower boundary defined by the size of a memory block. The portion of the address space defined by block size field 42 must be greater than or equal to the portion of the address space defined by block size field 40 of UMCS0 register 32. Table 2 below shows preferred block size field 42 encoding information for a microcontroller generating 20 address signals A0–A19 and having a corresponding 1 Mbyte memory address space.

TABLE 2

UMCS1 Block Size Field Programming Values.

| Block Size Field Contents | Memory Block Size | Corresponding Lower Boundary |
|---|---|---|
| 000 | 512K | 80000h |
| 001 | (Reserved) | |
| 010 | (Reserved) | |
| 011 | (Reserved) | |
| 100 | 256K | C0000h |
| 101 | (Reserved) | |
| 110 | 168K | E0000h |
| 111 | 64K | F0000h |

Figure 4:
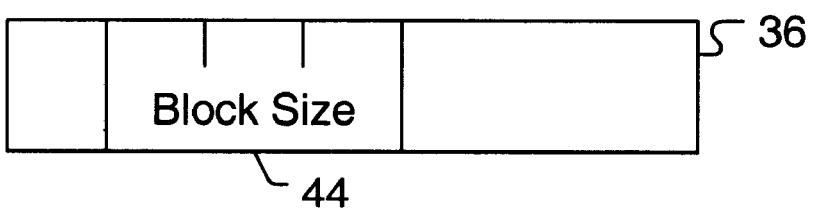
FIG. 4 is a block diagram of a preferred embodiment of an LMCS0 register of the CSU of FIG. 1, wherein the LMCS0 register includes a block size field for storing address range information relating to a lowermost portion of the microcontroller memory address space reserved for operating system software.

FIG. 4 is a block diagram of a preferred embodiment of LMCS0 register 36. LMCS0 register 36 includes a block size field 44 occupying three contiguous bit positions of LMCS0 register 36. Block size field 44 defines a portion of the memory address space of microcontroller 10 extending from the lowest address value (i.e., all address signals A0–Am−1 having a value of 0) to an upper boundary defined by the size of a memory block. Block size field 44 preferably contains encoded information relating the memory block size as shown in Table 3 below.

TABLE 3

LMCS0 Block Size Field Programming Values.

| Block Size Field Contents | Memory Block Size | Corresponding Upper Boundary |
|---|---|---|
| 000 | 64K | 0FFFFh |
| 001 | 168K | 1FFFFh |
| 010 | (Reserved) | |
| 011 | 256K | 3FFFFh |
| 100 | (Reserved) | |
| 101 | (Reserved) | |
| 110 | (Reserved) | |
| 111 | 512K | 7FFFFh |

Figure 5:
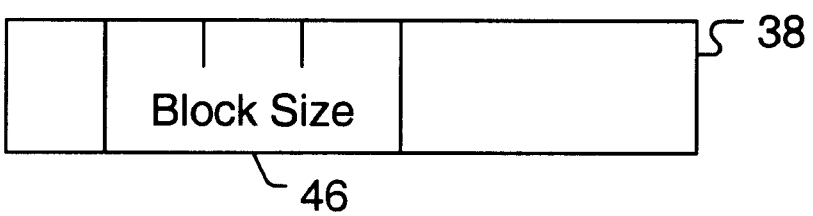
FIG. 5 is a block diagram of a preferred embodiment of an LMCS1 register within the CSU of FIG. 1, wherein the LMCS1 register includes a block size field for storing address range information relating to memory locations within an external memory device coupled to the microcontroller and mapped to the lowermost portion of the microcontroller memory address space.

FIG. 5 is a block diagram of a preferred embodiment of LMCS1 register 38. LMCS1 register 38 includes a block size field 46 occupying three contiguous bit positions of LMCS0 register 38. Block size field 46 defines a portion of the memory address space of microcontroller 10 extending from the lowest address value (i.e., all address signals A0–Am−1 having a value of 0) to an upper boundary defined by the size of a memory block. The portion of the address space defined by block size field 46 must be greater than or equal to the portion of the address space defined by block size field 44 of LMCS0 register 36. Block size field 46 preferably contains encoded information relating the memory block size as shown in Table 4 below.

TABLE 4

LMCS1 Block Size Field Programming Values.

| Block Size Field Contents | Memory Block Size | Corresponding Upper Boundary |
|---|---|---|
| 000 | 64K | 0FFFFh |
| 001 | 168K | 1FFFFh |
| 010 | (Reserved) | |
| 011 | 256K | 3FFFFh |
| 100 | (Reserved) | |
| 101 | (Reserved) | |
| 110 | (Reserved) | |
| 111 | 512K | 7FFFFh |

Figure 6:
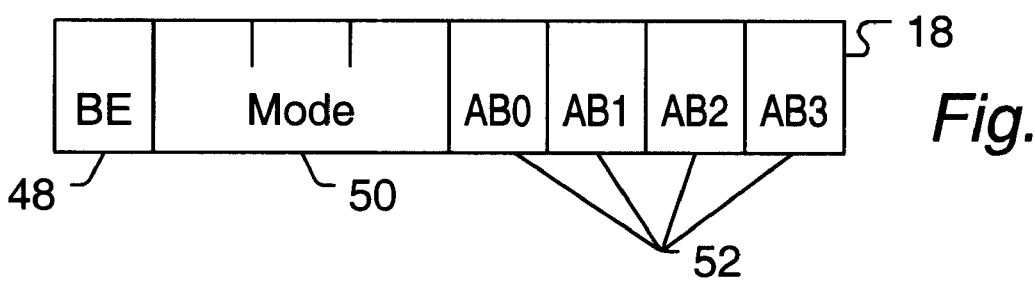
FIG. 6 is a block diagram of a preferred embodiment of the MBC register of FIG. 1, wherein the MBC register includes multiple bit positions for storing desired auxiliary address signal values.

FIG. 6 is a block diagram of a preferred embodiment of MBC register 18. MBC register 18 is programmable, and includes a single banking enable (BE) bit 48, a mode field 50 occupying three contiguous bit positions, and four address bits AB0–AB3 (labeled 52) corresponding to four respective auxiliary address signals AA0–AA3. Memory banking is enabled when BE bit 48 is a 1, and is disabled when BE bit 48 is a 0. AB0–AB3 contain the values of AA0–AA3 to be generated, thus defining a memory bank to be accessed as described above. The contents of the three bit positions of mode field 50 determine whether AB0–AB3 apply to a memory device mapped to the uppermost portion (U) or the lowermost portion (L) of the memory address space of microcontroller 10 per Table 5 below.

TABLE 5

MBC Register Mode Field Programming Values.

| Mode Field | Applies To Memory Device Mapped To: | | | |
|---|---|---|---|---|
| Contents | AB0 | AB1 | AB2 | AB3 |
| 000 | U | U | U | U |
| 001 | U | U | U | L |
| 010 | U | U | L | L |
| 011 | U | L | L | L |
| 100 | L | L | L | L |
| 101 | — | — | — | — |
| 110 | — | — | — | — |
| 111 | — | — | — | — |

When memory banking is enabled and chip select signals UCS0# and LCS0# are deasserted, AAG 20 produces AA0–AA3 with the values stored within bits AB0–AB3 (labeled 52) of MBC register 18. Software instructions executed by execution unit 12 select desired memory banks within external memory devices coupled to microcontroller 10 by storing appropriate values within bits AB0–AB3 (labeled 52) of MBC register 18. When address signals A0–Am-1 indicating an address within the uppermost portion of the memory address space reserved for operating system software are generated by BIU 14, CSU 16 asserts chip select signal UCS0#. When chip select signal UCS0# is asserted, AAG 20 ignores the contents of bits AB0–AB3 (labeled 52) of MBC register 18 and produces the subset of auxiliary address bits AA0–AA3 associated with the uppermost portion of the memory address space with predetermined values. For example, when memory banking is enabled and chip select signal UCS0# is asserted, AAG 20 may produce the subset of auxiliary address bits AA0–AA3 associated with the uppermost portion of the memory address space with values of 1. As a result, operating system software need only reside within one of the memory banks mapped to the uppermost portion of the memory address space, and the corresponding portions of all other memory banks mapped to the uppermost portion of the memory address space are thus made available for application programs.

When an address within the lowermost portion of the memory address space reserved for operating system software is generated by BIU 14, CSU 16 asserts chip select signal LCS0#. When memory banking is enabled and chip select signal LCS0# is asserted, AAG 20 ignores the contents of bits AB0–AB3 (labeled 52) of MBC register 18 and produces the subset of address bits AA0–AA3 associated with the lowermost portion of the memory address space with predetermined values. For example, when memory banking is enabled and chip select signal LCS0# is asserted, AAG 20 may produce the subset of auxiliary address bits AA0–AA3 associated with the lowermost portion of the memory address space with values of 0. As a result, operating system software need only reside within one of the memory banks mapped to the lowermost portion of the memory address space, and the corresponding portions of all other memory banks mapped to the lowermost portion of the memory address space are thus made available for application programs.

Figure 7:
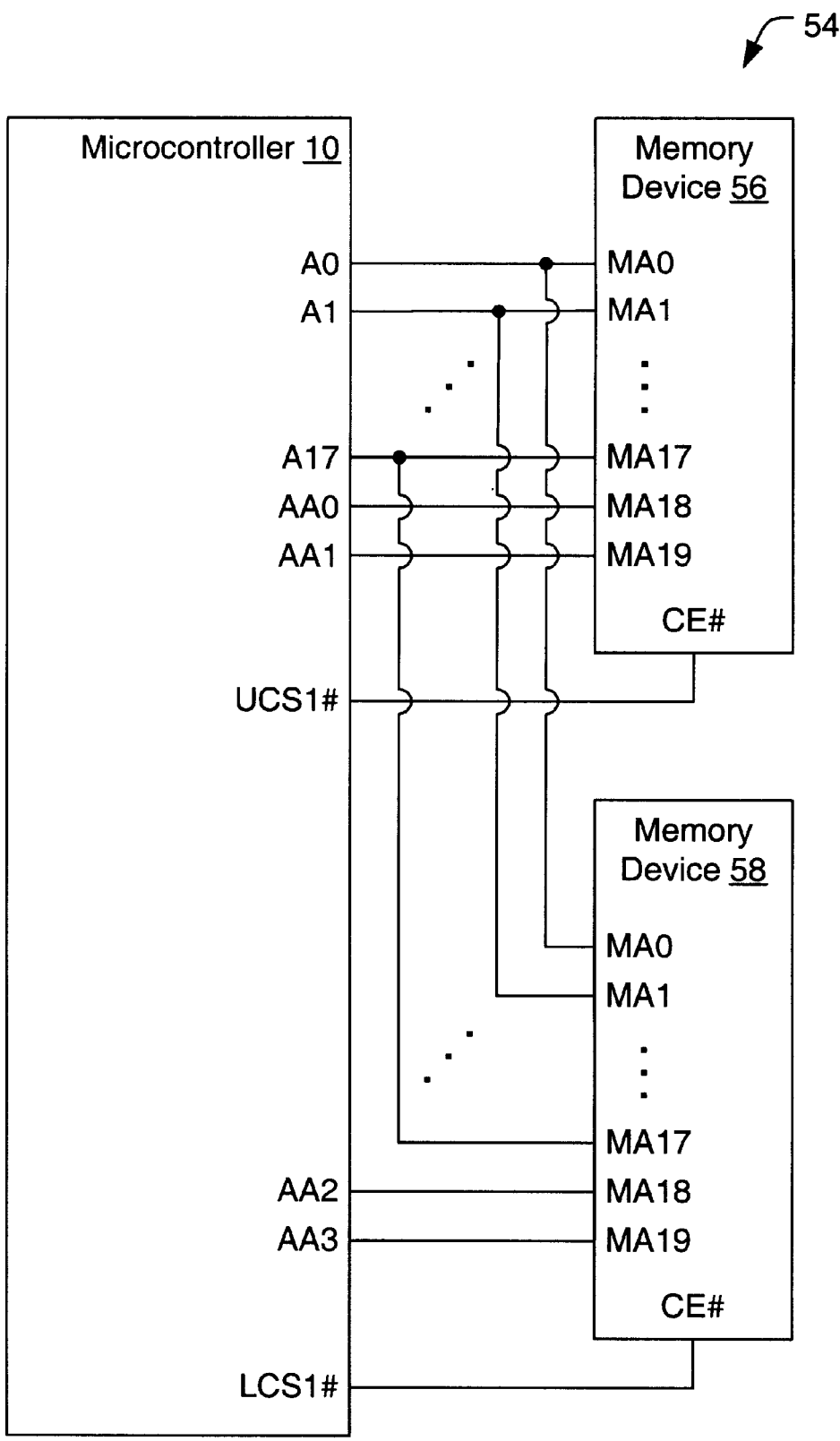
FIG. 7 is a block diagram of a computer system including the microcontroller of FIG. 1 coupled to a first and second external memory devices, wherein two auxiliary address signals AA0 and AA1 allow access to all memory locations within the first external memory device, and wherein two auxiliary address signals AA2 and AA3 allow access to all memory locations within the second external memory device.

FIG. 7 will now be used to further describe microcontroller 10a by way of an illustrative example application. FIG. 7 is a block diagram of a computer system 54 including microcontroller 10. Microcontroller 10 is coupled to a first memory device 56 and a second memory device 58. Memory device 56 may be, for example, a 1024×8 Flash memory device having 20 address terminals MA0–MA19 and a chip enable terminal CE#. Memory device 58 may be, for example, a 1024×8 SRAM memory device also having 20 address terminals MA0–MA19 and a chip enable terminal CE#. Microcontroller 10 generates 20 address signals A0–A19, but only the first 18 address signals A0–A17 are used. Memory device 56 is mapped to the uppermost 512K portion of the 1 Mbyte memory address space of microcontroller 10 by the contents of UMCS1 register 34. Memory device 58 is mapped to the lowermost 512K portion of the 1 Mbyte memory address space of microcontroller 10 by the contents of LMCS1 register 38. Address terminals MA0–MA17 of both memory device 56 and memory device 58 are coupled to respective address signals A0–A17 generated by microcontroller 10. Chip enable terminal CE# of memory device 56 is coupled to chip select signal UCS1# generated by microcontroller 10, and chip enable terminal CE# of memory device 58 is coupled to chip select signal LCS1# generated by microcontroller 10. Auxiliary address signals AA0 and AA1 generated by microcontroller 10 are mapped to the uppermost portion of the address space by the contents of MBC register 18 and are coupled to address terminals MA18 and MA19, respectively, of memory device 56. Auxiliary address signals AA2 and AA3 generated by microcontroller 10 are mapped to the lowermost portion of the address space by the contents of MBC register 18 and coupled to address terminals MA18 and MA19, respectively, of memory device 58. Memory devices 56 and 58 also include data terminals MD0–MD7 (not shown) respectively coupled to data signals D0–D7 (not shown) of microcontroller 10.

Figure 8:
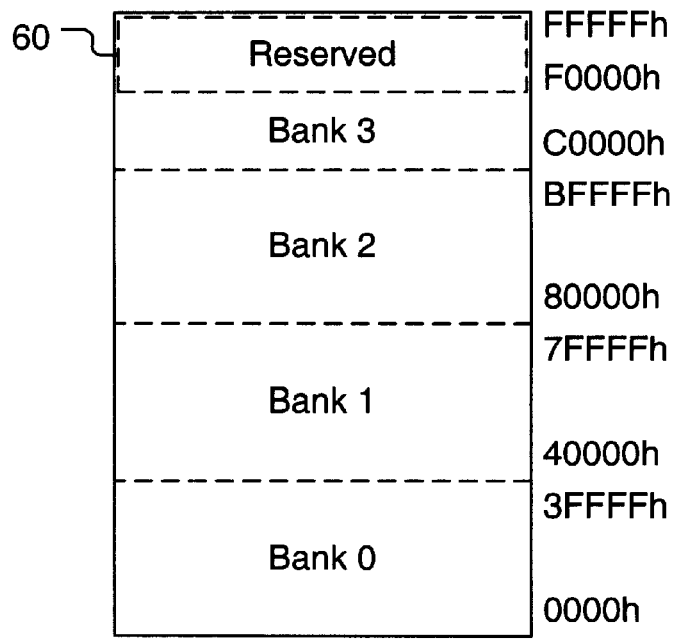
FIG. 8 is a block diagram of a memory map of the first memory device of FIG. 7, wherein the auxiliary address signals AA0 and AA1 divide the memory locations within the first memory device into four memory banks 0–3 each having an equal number of memory locations, and wherein only a reserved portion of memory bank 3 is accessed when an address within the uppermost portion of the memory address space reserved for operating system software is generated.

FIG. 8 is a block diagram of a memory map of first memory device 56. FIG. 8 illustrates how auxiliary address signals AA0 and AA1, generated by AAG 20, divide the memory locations within memory device 56 into four memory banks 0–3 each containing 256K memory locations. The memory locations within each memory bank are mapped to the uppermost portion of the memory address space of microcontroller 10 and accessible using the 18 address signals A0–A17. Software instructions executed by execution unit 12 select the desired memory bank by storing values within bits AB0–AB1 of MBC register 18 according to Table 6 below.

TABLE 6

Values of AA0 and AA1 and Selected Memory Bank.

| AA0 | AA1 | Memory Bank Selected |
|---|---|---|
| 0 | 0 | Bank 0 |
| 0 | 1 | Bank 1 |
| 1 | 0 | Bank 2 |
| 1 | 1 | Bank 3 |

When an address within the uppermost portion of the memory address space reserved for operating system software is generated by BIU 14, CSU 16 asserts chip select signal UCS0#. Upon receiving the asserted UCS0# signal, AAG 20 ignores the contents of AB0 and AB1 within MBC register 18 and produces AA0 and AA1 with values of 1. Thus reserved portion 60 of bank 3 of memory device 56 is always accessed when an address within the uppermost portion of the memory address space is generated by BIU 14, regardless of the contents of AB0 and AB1 within MBC register 18. As a result, operating system software residing within bank 3 need not be duplicated within banks 0–2, freeing up the corresponding portions of banks 0–2 for applications programs.

Figure 9:
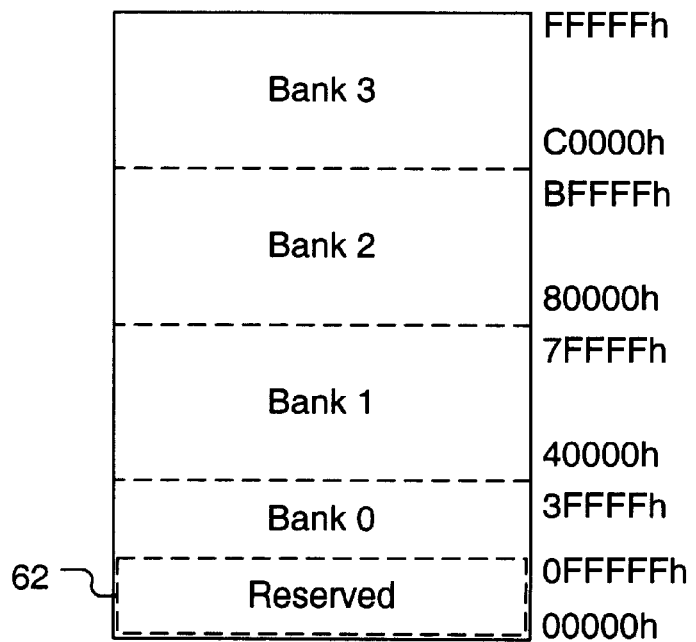
FIG. 9 is a block diagram of a memory map of the second memory device of FIG. 7, wherein the auxiliary address signals AA2 and AA3 divide the memory locations within the second memory device into four memory banks 0–3 each having an equal number of memory locations, and wherein only a reserved portion of memory bank 0 is accessed when an address within the lowermost portion of the memory address space reserved for operating system software is generated.

FIG. 9 is a block diagram of a memory map of second memory device 58. FIG. 9 illustrates how auxiliary address signals AA2 and AA3, also generated by AAG 20, divide up the augmented address space associated with memory device 58 into four memory banks 0–3 each containing 256K memory locations. The memory locations within each memory bank are mapped to the lowermost portion of the memory address space of microcontroller 10 and are accessible using the first 18 address signals A0–A17. Software instructions executed by execution unit 12 select the desired memory bank by storing values within bits AB2–AB3 of MBC register 18 according to Table 7 below.

TABLE 7

Values of AA2 and AA3 and Selected Memory Bank.

| AA2 | AA3 | Memory Bank Selected |
|---|---|---|
| 0 | 0 | Bank 0 |
| 0 | 1 | Bank 1 |
| 1 | 0 | Bank 2 |
| 1 | 1 | Bank 3 |

When an address within the lowermost portion of the memory address space reserved for operating system software is generated by BIU 14, CSU 16 asserts chip select signal LCS0# as described above. Upon receiving the asserted ICS0# signal, AAG 20 ignores the contents of bits AB2 and AB3 within MBC register 18 and produces AA2 and AA3 with values of 0. Thus reserved portion 62 of bank 0 is always accessed when an address within the lowermost portion of the memory address space is generated by BIU 14, regardless of the contents of bits AB2 and AB3 within MBC register 18. As a result, operating system software residing within bank 0 need not be duplicated within banks 1–3 of memory device 58, freeing up the corresponding portions of banks 1–3 for applications programs.

Figure 10:
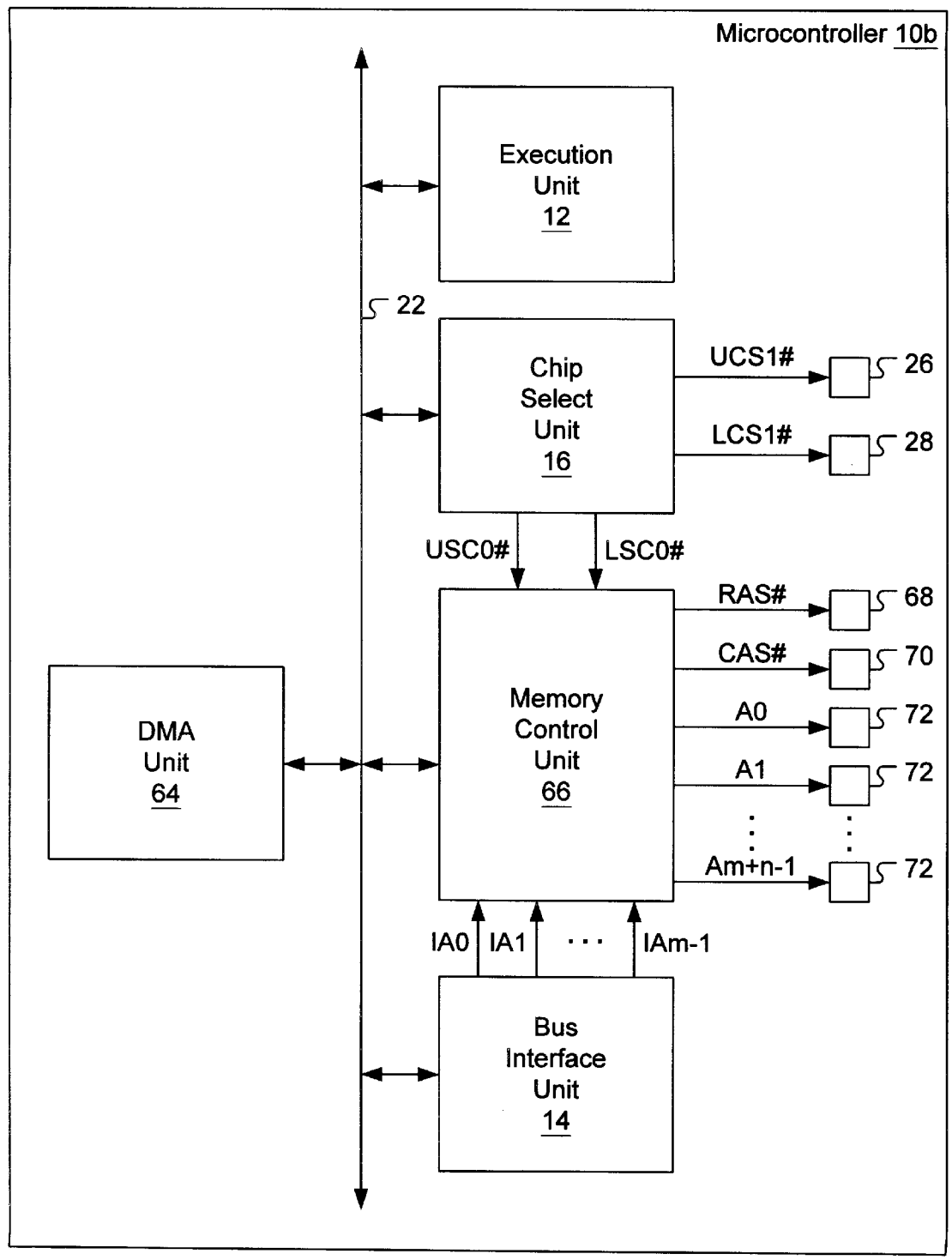
FIG. 10 is a block diagram of a second embodiment of the microcontroller of the present invention, wherein the microcontroller includes an execution unit, a bus interface unit (BIU), a chip select unit (CSU), a DMA unit, and a memory control unit (MCU)

FIG. 10 is a block diagram of a microcontroller 10*b*, wherein microcontroller 10*b* is a second embodiment of microcontroller 10 of the present invention. Elements microcontroller 10*b* shares with microcontroller 10*a* (FIGS. 1–9) are numbered similarly. Microcontroller 10*b* includes execution unit 12, BIU 14, CSU 16, core bus 22, first I/O pad 26, second I/O pad 28, a direct memory access (DMA) unit 64, a memory control unit (MCU) 66, a third I/O pad 68, a fourth I/O pad 70, and a set of I/O pads 72 all formed upon a single monolithic semiconductor substrate (i.e., chip). Execution unit 12, BIU 14, CSU 16, DMA unit 64, and MCU 66 are coupled to core bus 22 and communicate with one another via signals driven upon the signal lines of core bus 22.

MCU 66 generates address and control signals used to store data within and retrieve data from one or more external memory devices coupled to microcontroller 10*b*. MCU 66 generates address and control signals such that the external memory devices may be, for example, SRAM devices, DRAM devices, or Flash memory devices. MCU 66 includes circuitry required to generate multiplexed address signals and the RAS# and CAS# control signals required to access memory locations within DRAM devices.

BIU 14 of microcontroller 10*b* generates m internal address signals IA0–IAm-1 during data transfer operations, where m is preferably the number of address signals produced by a previous microcontroller product in order to maintain software compatibility therewith. BIU 14 combines an address offset portion produced by execution unit 12 with a segment portion to produce an m-bit internal address as described above. Simultaneous values of internal address signals IA0–IAm-1 define an internal address.

CSU 16 receives internal address signals IA0–IAm-1 generated by BIU 14 via core bus 22 and uses internal address signals IA0–IAm-1 to generate chip select signals which enable external memory devices during data transfer operations. Each chip select signal is associated with a programmable range of internal addresses. CSU 16 asserts a chip select signal when internal address signals IA0–IAm-1 define an internal address within the corresponding range of internal addresses.

DMA unit 64 preferably includes multiple independent DMA channels, each DMA channel being capable of transferring data between two different address ranges within the memory address space of microcontroller 10*b* without involving execution unit 12. Each DMA channel preferably includes multiple programmable registers, the contents of which determine the operation of the corresponding DMA channel. The registers are preferably programmed with a source address, a destination address, and a transfer count defining the number of data units (e.g., bytes) to be transferred.

MCU 66 generates m+n address signals A0–Am+n-1, where n≧2. The most significant address signals divide memory locations within an external memory device receiving the address signals into multiple memory banks of equal size as described above. The remaining least significant address signals are used to access the memory locations within each memory bank. Each address signal A0–Am+n-1 is driven upon a corresponding member of the set of I/O pads 72. The DRAM device control signals RAS# and CAS# are driven upon respective third I/O pad 68 and fourth I/O pad 70. The address space of microcontroller 10*b* is $2^{m+n}$, where m+n is the number of address signals simultaneously generated by MCU 66.

Figure 11:
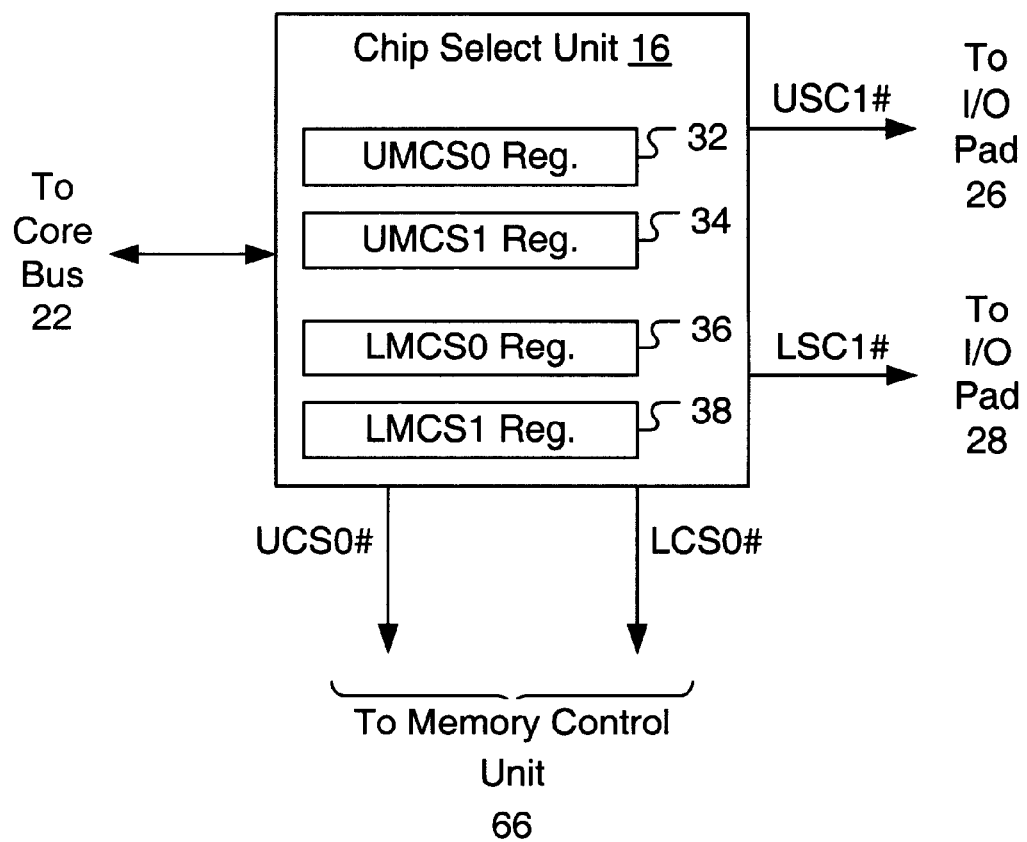
FIG. 11 is a block diagram of a preferred embodiment of the CSU of FIG. 1, wherein the CSU includes several chip select registers used to generate chip select signals.

FIG. 11 is a block diagram of a preferred embodiment of CSU 16. CSU 16 includes UMCS0 register 32, UMCS1 register 34, LMCS0 register 36, and LMCS1 register 38. UMCS0 register 32, UMCS1 register 34, LMCS0 register 36, and LMCS1 register 38 are programmable registers, meaning software instructions may change the contents of any one of these registers by writing a value to an address associated with the target register. As described above, CSU 16 uses address range information stored within UMCS0 register 32 to generate chip select signal UCS0#, address range information stored within UMCS1 register 34 to generate chip select signal UCS1#, address range information stored within LMCS0 register 36 to generate chip select signal LCS0#, and address range information stored within LMCS1 register 38 to generate chip select signals LCS1#. Chip select signals UCS1# and LCS1# are driven upon respective first I/O pad 26 and second I/O pad 28, and are also driven upon signal lines of core bus 22.

Two sections of the memory address space of microcontroller 10*b*, an uppermost section and a lowermost section, are reserved for operating system software as described above. Address range information stored within UMCS0 register 32 defines the uppermost section reserved for operating system software, and address range information stored within LMCS0 register 36 defines the lowermost section reserved for operating system software. CSU 16 asserts signal UCS0# when internal address signals IA0–IAm-1 correspond to an address within the uppermost section reserved for operating system software. Similarly, CSU 16 asserts signal LCS0# when internal address signals IA0–IAm-1 correspond to an address within the lowermost section reserved for operating system software.

Figure 12:
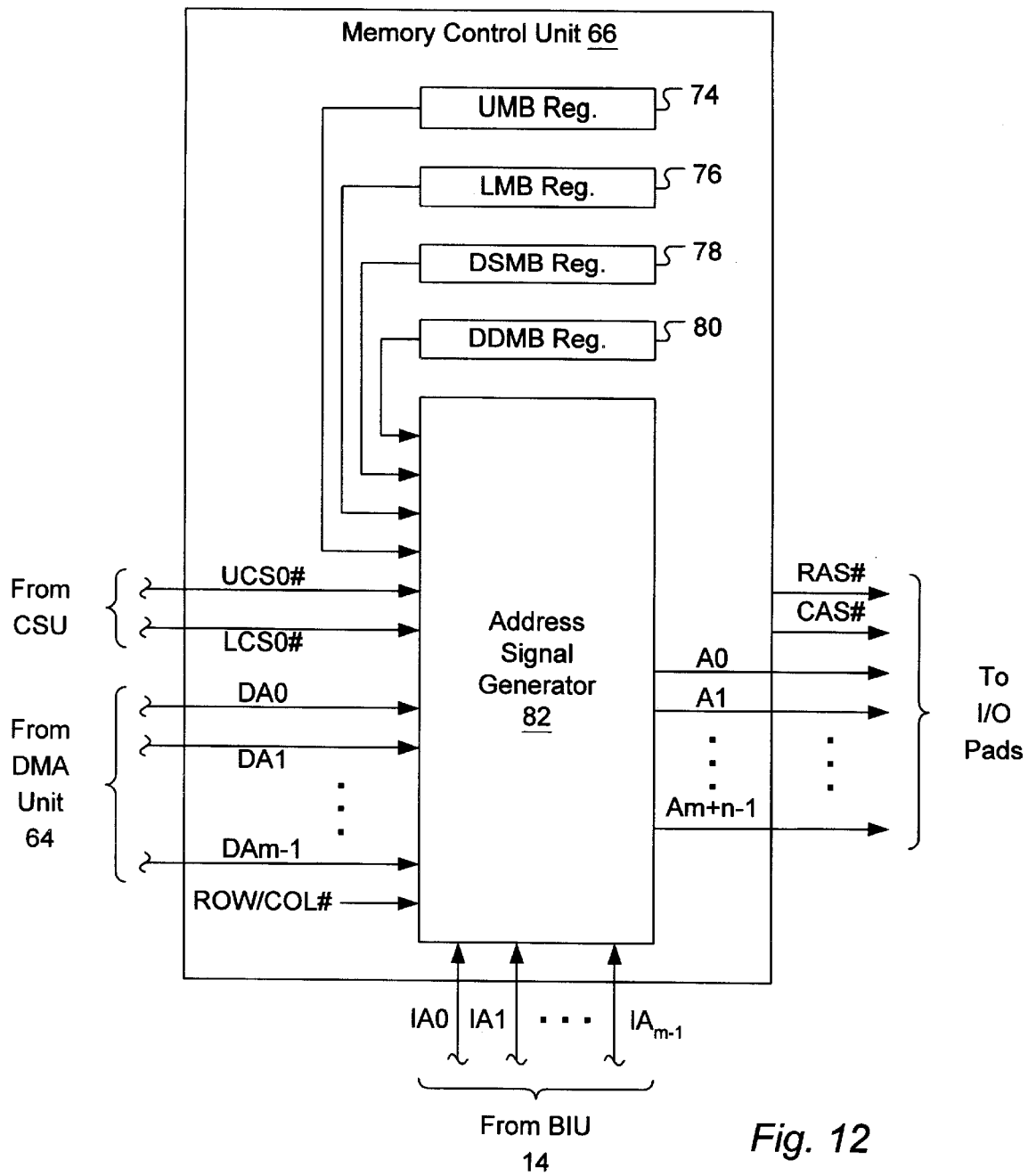
FIG. 12 is a block diagram of a preferred embodiment of the MCU of FIG. 10, wherein the MCU includes an upper memory banking (UMB) register, a lower memory banking (LMB) register, a DMA source memory banking (DSMB) register, a DMA destination memory banking (DDMB) register, and an address signal generator (ASG), wherein the ASG generates multiple address signals using values stored in the UMB, LMB, DSMB, and DDMB registers.

FIG. 12 is a block diagram of a preferred embodiment of MCU 66. MCU 66 includes an upper memory banking (UMB) register 74, a lower memory banking (LMB) register 76, a DMA source memory banking (DSMB) register 78, a DMA destination memory banking (DDMB) register 80, and an address signal generator (ASG) 82. MCU 66 includes circuitry to generate an internal row/column (ROW/COL#) signal in addition to the DRAM control signals RAS# and CAS#.

ASG 82 of MCU 66 receives m DMA address signals DA0–DAm−1 generated by DMA unit 64 via core bus 22. ASG 82 also receives chip select signals UCS1# and LCS1# produced by CSU 16 via core bus 22. ASG 82 also receives chip select signals UCS0# and LCS0# directly from CSU 16, in addition to the m internal address signals IA0–IAm−1 generated by BIU 14. ASG 82 of MCU 66 uses the m internal address signals IA0–IAm−1, the m DMA address signals DA0–DAm−1, chip select signals UCS0#, UCS1#, LCS0#, and LCS1#, and the contents of the UMB, LMB, DSMB, and DDMB registers along with the ROW/COL# signal to produce address signals A0–Am+n−1.

When microcontroller 10b is coupled to an external DRAM device, signal ROW/COL# is a 1 when address signals A0–Am+n−1 are being used to convey a row address to the external DRAM device, and signal ROW/COL# is a 0 when address signals A0–Am+n−1 are being used to convey a column address to the external DRAM device. Thus when microcontroller 10b is coupled to an external DRAM device, signal ROW/COL# alternates between 0 and 1 during memory access operations involving the external DRAM device. When microcontroller 10b is coupled to one or more external memory devices which do not use multiplexed address lines (e.g., SRAM devices or Flash memory devices), signal ROW/COL# remains a constant 1.

Figure 13:
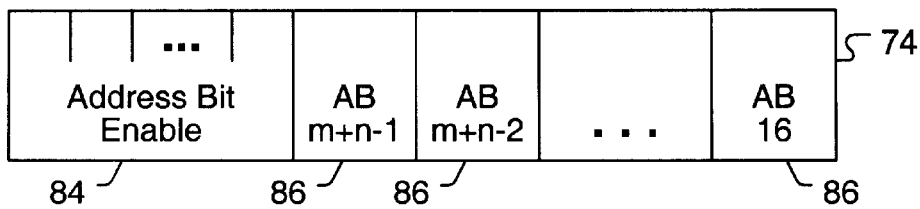
FIG. 13 is a block diagram of a preferred embodiment of the UMB register of FIG. 12, wherein the UMB register includes an address bit enable field and several address bit positions, and wherein each address bit position is used to store the value of a corresponding address signal, and wherein the address bit enable field is used to store a value which determines which of the address bit positions are active (i.e., used by the MCU to generate corresponding address signals)

FIG. 13 is a block diagram of a preferred embodiment of UMB register 74. UMB register 74 is programmable, and includes an address bit enable field 84 and several address bit (AB) positions 86. Each address bit position 86 corresponds to an address signal generated by MCU 66. For example, address bit position ABm+n−1 corresponds to address signal Am+n−1, and address bit position AB16 corresponds to address signal A16. In the preferred embodiment, the number of address bit positions 86 is chosen to provide memory banking for memory devices having more than $2^{16}$ (65,536 or 64K) memory locations. Thus AB16 is the least significant of address bit positions 86. Address bit enable field 84 includes several contiguous bit positions, and the contents of address bit enable field 84 determine which address bit positions 86 are active (i.e., used by MCU 66 to generate corresponding address signals) according to Table 8 below.

TABLE 8

Register Address Bit Enable Field Programming Values.

| Address Bit Enable Field Contents | Active Address Bits |
|---|---|
| 0 . . . 00 | (None) |
| 0 . . . 01 | ABm+n−1 |
| 0 . . . 10 | ABm+n−1, ABm+n−2 |
| . | . |
| . | . |
| . | . |
| 1 . . . 11 | ABm+n−1, ABm+n−2, . . . , AB16 |

For example, if m=20 and n=2, address bit enable field 84 of UMB register 74 includes 3 contiguous bit positions and there are 6 address bit positions 86: AB21–AB16. If address bit enable field 84 contains the value 000, memory banking in the uppermost portion of the memory address space of microcontroller 10b is not provided. If the contents of address bit enable field 84 is 001, memory banking is provided, and MCU 66 uses address bit position AB21 to produce address signal A21. If address bit enable field 74 contains 010, MCU 66 uses address bit position AB21 to produce address signal A21 and address bit position AB20 to produce address signal A20. If address bit enable field 74 contains 110 or 111, MCU 66 uses all of the address bit positions 86 within UMB register 84 to produce the corresponding address signals.

Figure 14:
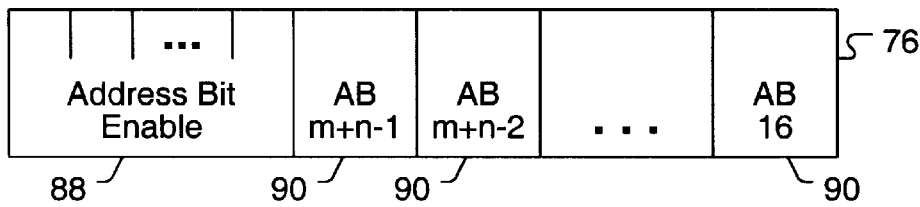
FIG. 14 is a block diagram of a preferred embodiment of the LMB register of FIG. 12, wherein the LMB register includes an address bit enable field and several address bit positions, and wherein each address bit position is used to store the value of a corresponding address signal, and wherein the address bit enable field is used to store a value which determines which of the address bit positions are active.

FIG. 14 is a block diagram of a preferred embodiment of LMB register 76. LMB register 76 is programmable, and includes an address bit enable field 88 and several address bit (AB) positions 90. Each address bit position 90 corresponds to an address signal generated by MCU 66. For the reasons described above, AB16 is the least significant of address bit positions 90. Address bit enable field 88 includes several contiguous bit positions, and the contents of address bit enable field 88 determine which address bit positions 90 are active (i.e., used by MCU 66 to generate corresponding address signals) according to Table 8 above. Memory banking in the lowermost portion of the memory address space of microcontroller 10b is disabled when address bit enable field 88 contains the value 0 . . . 00, and is enabled otherwise.

Figure 15:
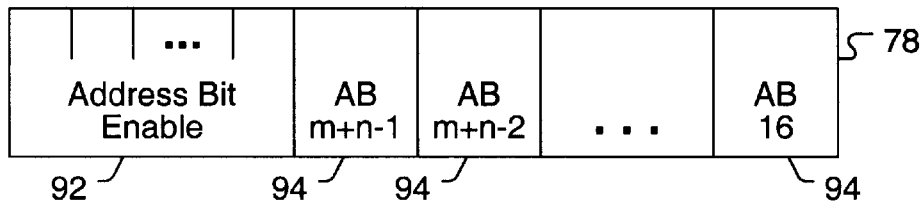
FIG. 15 is a block diagram of a preferred embodiment of the DSMB register of FIG. 12, wherein the DSMB register includes an address bit enable field and several address bit positions, and wherein each address bit position is used to store the value of a corresponding address signal generated during a source read portion of a DMA data transfer operation, and wherein the address bit enable field is used to store a value which determines which of the address bit positions are active.

FIG. 15 is a block diagram of a preferred embodiment of DSMB register 78. DSMB register 78 is programmable, and includes an address bit enable field 92 and several address bit (AB) positions 94. Each address bit position 94 corresponds to an address signal generated by MCU 66, and contains a value of the corresponding address signal to be generated during a data read from a source address as part of a DMA access. For the reasons described above, AB16 is the least significant of address bit positions 94. Address bit enable field 92 includes several contiguous bit positions, and the contents of address bit enable field 92 determine which address bit positions 94 are active (i.e., used by MCU 66 to generate corresponding address signals) according to Table 8 above. Memory banking during reading of data from a source address as part of a DMA data transfer operation is disabled when address bit enable field 92 contains the value 0 . . . 00, and is enabled otherwise.

Figure 16:
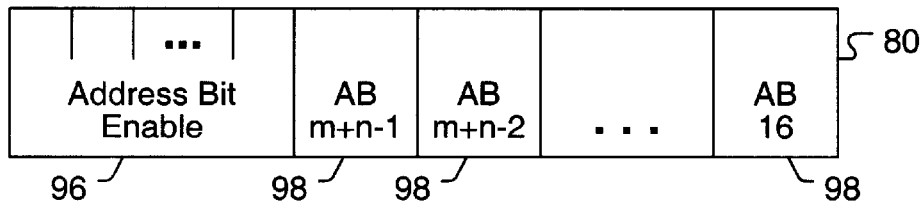
FIG. 16 is a block diagram of a preferred embodiment of the DDMB register of FIG. 12, wherein the DDMB register includes an address bit enable field and several address bit positions, and wherein each address bit position is used to store the value of a corresponding address signal generated during a destination write portion of a DMA data transfer operation, and wherein the address bit enable field is used to store a value which determines which of the address bit positions are active.

FIG. 16 is a block diagram of a preferred embodiment of DDMB register 80. DDMB register 80 is programmable, and includes an address bit enable field 96 and several address bit (AB) positions 98. Each address bit position 98 corresponds to an address signal generated by MCU 66, and contains the value of the corresponding address signal to be generated during a data write to a destination address as part of a DMA access. AB16 is the least significant of address bit positions 98 for the reasons described above. Address bit enable field 96 includes several contiguous bit positions, and the contents of address bit enable field 96 determine which address bit positions 98 are active (i.e., used by MCU 66 to generate corresponding address signals) according to Table 8 above. Memory banking during the writing of data to a destination address as part of a DMA data transfer operation is disabled when address bit enable field 96 contains the value 0 . . . 00, and is enabled otherwise.

DSMB register 78 and DDMB register 80 allow DMA transfers to be performed independently of memory accesses during instruction execution. It is noted that DSMB register 78 and DDMB register 80 are associated with a single DMA channel. Microcontroller 10b preferably has several independent DMA channels, and each DMA channel has associated with it a DSMB register 78 and a DDMB register 80.

As described above, MCU 66 generates address and control signals such that external memory devices coupled to microcontroller 10b may be, for example, SRAM devices, DRAM devices, or Flash memory devices. MCU 66 includes circuitry required to generate multiplexed address signals and the RAS# and CAS# control signals required to access memory locations within DRAM devices. When a DRAM device is coupled to microcontroller 10b, MCU 66 generates address signals A0–Am+n−1 such that DRAM devices of varying sizes are supported with a minimum amount of reconfiguration.

Normally, the most significant bits of the address (i.e., the row address) of a memory location within a DRAM device are conveyed to the address pins of the DRAM device during a first portion of a memory access operation, and the RAS# signal is asserted to store the row address within (i.e., strobe the row address into) the DRAM device. The remaining least significant bits of the address (i.e., the column address) of the memory location are then conveyed to the same address pins of the DRAM device during a second portion of the memory access operation, and the CAS# signal is asserted to strobe the column address into the DRAM device. The DRAM device then either drives one or more data pins with the contents of the accessed memory location (data read operation) or stores logic values present upon the one or more data pins within the accessed memory location (data write operation). Table 9 below illustrates row and column address signals corresponding to a 20-bit address A0–A19 typically conveyed to the 10 address pins MA0–MA9 of a 1 Mbyte DRAM device during respective first and second portions of a memory access operation.

TABLE 9

Row and Column Addresses During a Memory Access Operation.

| DRAM Address Pin | Row Address | Column Address |
| --- | --- | --- |
| MA9 | A19 | A9 |
| MA8 | A18 | A8 |
| MA7 | A17 | A7 |
| MA6 | A16 | A6 |
| MA5 | A15 | A5 |
| MA4 | A14 | A4 |
| MA3 | A13 | A3 |
| MA2 | A12 | A2 |
| MA1 | A11 | A1 |
| MA0 | A10 | A0 |

When a larger DRAM device is coupled to a microcontroller, different address signals must typically be conveyed to the address pins of the DRAM device during each portion of the memory access operation. Accommodation of the larger DRAM device typically requires hardware/software reconfiguration to generate the correct address signals during the correct portions of the memory access operation. In addition, the signal lines connecting address pins of the microcontroller to address pins of the larger DRAM device must be rerouted.

MCU 66 allows microcontroller 10b to easily accommodate DRAM devices of varying sizes by generating address signals corresponding to alternating even-numbered (or odd-numbered) address bits during the first portion of a data transfer operation, and generating address signals corresponding to the remaining alternating odd-numbered (or even-numbered) address bits during the second portion of a data transfer operation. This allows microcontroller 10b to accommodate DRAM devices of varying sizes without modifying address signal generation or rerouting address signal lines. Table 9 below illustrates an example of row and column address signals generated by MCU 66 of microcontroller 10b and corresponding to a 20-bit address A0–A19 conveyed to the 10 address pins MA0–MA9 of a 1 Mbyte DRAM device during respective first and second portions of a memory access operation.

TABLE 9

Example Row and Column Addresses Generated By MCU 66 During a Memory Access Operation.

| DRAM Address Pin | Row Address | Column Address |
| --- | --- | --- |
| MA9 | A19 | A18 |
| MA8 | A17 | A16 |
| MA7 | A15 | A14 |
| MA6 | A13 | A12 |
| MA5 | A11 | A10 |
| MA4 | A9 | A8 |
| MA3 | A7 | A6 |
| MA2 | A5 | A4 |
| MA1 | A3 | A2 |
| MA0 | A1 | A0 |

A larger DRAM device is accommodated by simply coupling additional address signals to the additional address pins of the larger DRAM device. The generation and routing of existing address signals does not change. A smaller DRAM device is accommodated by simply decoupling address signals no longer needed.

Table 10 below describes how MCU 66 generates address signals A0–Am+n−1 in a working example in which m=20 and n=2. Microcontroller 10b thus has 22 address pins A0–A21 driven by address signals as indicated in Table 10. BIU 14 generates 20 internal address signals IA0–IA19 as a result of instruction execution, and DMA unit 64 generates 20 DMA address signals DA0–DA19 during DMA transfer operations. In Table 10, Dn is the value of address bit ABn within DSMB register 78 (DMA source read) or address bit ABn within DDMB register 80 (DMA destination write), Un is the value of address bit ABn within UMB register 74, and Ln is the value of address bit ABn within LMB register 76.

Table 10 covers situations in which chip select signals UCS0# and LCS0# are not asserted. When chip select signal UCS0# or LCS0# is asserted and the values of one or more address bits within UMB register 74 or LMB register 76 are selected, ASG 82 of MCU 66 produces the corresponding address signal having a predetermined value in order to access a single memory bank as described above. For example, if UCS0# is asserted and an address bit within UMB register 74 is selected, ASG 82 of MCU 66 may produce the corresponding address signal having a value of 1 as described above. Similarly, if LCS0# is asserted and an address bit within LMB register 76 is selected, ASG 82 of MCU 66 may produce the corresponding address signal having a value of 0 as described above.

TABLE 10

Generation of Address Signals for m = 20 and n = 2.

| Address Pin | Initial (Row) Address Signal | Second (Column) Address Signal |
| --- | --- | --- |
| A0 | IA0 or DA0 | IA1 or DA1 |
| A1 | IA1 or DA1 | IA2 or DA2 |
| A2 | IA2 or DA2 | IA3 or DA3 |
| A3 | IA3 or DA3 | 1A4 or DA4 |
| A4 | IA4 or DA4 | IA5 or DA5 |

TABLE 10-continued

Generation of Address Signals for m = 20 and n = 2.

| Address Pin | Initial (Row) Address Signal | Second (Column) Address Signal |
| --- | --- | --- |
| A5 | IA5 or DA5 | IA6 or DA6 |
| A6 | 1A6 or DA6 | IA7 or DA7 |
| A7 | IA7 or DA7 | IA8 or DA8 |
| A8 | IA8 or DA8 | IA9 or DA9 |
| A9 | IA9 or DA9 | IA10 or DA10 |
| A10 | IA10 or DA10 | IA11 or DA11 |
| A11 | IA11 or DA11 | IA12 or DA12 |
| A12 | IA12 or DA12 | IA13 or DA13 |
| A13 | IA13 or DA13 | IA14 or DA14 |
| A14 | IA14 or DA14 | IA15 or DA15 |
| A15 | IA15 or DA15 | IA16, DA16, D16, U16, or L16 |
| A16 | IA16, DA16, D16, U16, or L16 | IA17, DA17, D17, U17, or L17 |
| A17 | IA17, DA17, D17, U17, or L17 | IA18, DA18, D18, U18, or L18 |
| A18 | IA18, DA18, D18, U18, or L18 | IA19, DA19, D19, U19, or L19 |
| A19 | IA19, DA19, D19, U19, or L19 | D20, U20, or L20 |
| A20 | D20, U20, or L20 | D21, U21, or L21 |
| A21 | D21, U21, or L21 | D21, U21, or L21 |

Inherent in Table 10 is the fact that memory banking is not an option for memory devices containing $2^{16}$ (65,536 or 64K) or fewer memory locations. Thus UMB register 74, LMB register 76, DSMB register 78, and DDMB register 80 include 6 address bits AB16–AB21 as described above.

Even-numbered address pins (i.e., address pins A0, A2, . . . , A20) are connected to address pins of memory devices configured to store 8-bit values (i.e., ×8 memory devices). Odd-numbered address pins (i.e. address pins A1, A3, . . . , A21) are connected to address pins of memory devices configured to store 16-bit values (i.e., ×16 memory devices).

Figure 17:
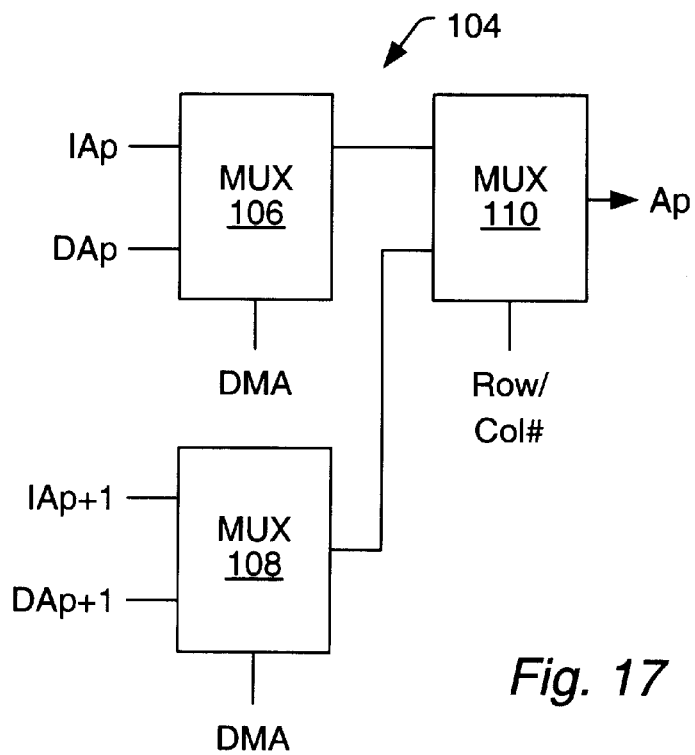
FIG. 17 is a block diagram of an example logic system which may be embodied within the ASG of FIG. 12 in order to generate an address signal Ap where p=0, 1, 2, . . . , 14.

FIG. 17 will now be used to describe the generation of address signals A0–A14 by ASG 82 of MCU 66. ASG 82 receives a 'DMA' signal from DMA unit 64 via core bus 22 in addition to DA0–DA19. Signal DMA is a 1 when a DMA data transfer operation is in progress, and is a 0 otherwise. FIG. 17 is a block diagram of an example logic system 104 which may be embodied within ASG 82 of MCU 66 in order to generate an address signal Ap, where p=0, 1, 2, . . . , 14. Logic system 104 includes a first MUX 106 with data input signals IAp generated by BIU 14 and DAp generated by DMA unit 64, and a second MUX 108 with data input signals IAp+1 generated by BIU 14 and DAp+1 generated by DMA unit 64. Output signals produced by MUX 106 and MUX 108 are the input signals to a third MUX 110. MUX 110 produces output signal Ap by selecting between the output signals produced by MUX 106 and MUX 108 dependent upon the value of the ROW/COL# signal generated by MCU 66. When a DMA transfer operation is not in progress, signal DMA has a value of 0, MUX 106 produces an output signal IAp, and MUX 108 produces an output signal IAp+1. If microcontroller 10*b* is coupled to an external non-DRAM device (e.g., an SRAM device or a Flash memory device), the value of the ROW/COL# signal remains a steady 1, and MUX 110 produces signal IAp as output signal Ap.

If, on the other hand, microcontroller 10*b* is coupled to an external DRAM device, the value of the ROW/COL# signal alternates during each memory access operation as described above. During the first portion of the memory access operation, the value of the ROW/COL# signal is a 1, and MUX 110 produces signal IAp as output signal Ap. At the end of the first portion of the memory access operation, MCU 66 asserts the RAS# signal to store the address signals within the external DRAM device. During the second portion of the memory access operation, the value of the ROW/COL# signal is a 0, and MUX 110 produces signal IAp+1 as output signal Ap. At the end of the second portion of the memory access operation, MCU 66 asserts the CAS# signal to store the address signals within the external DRAM device.

Figure 18:
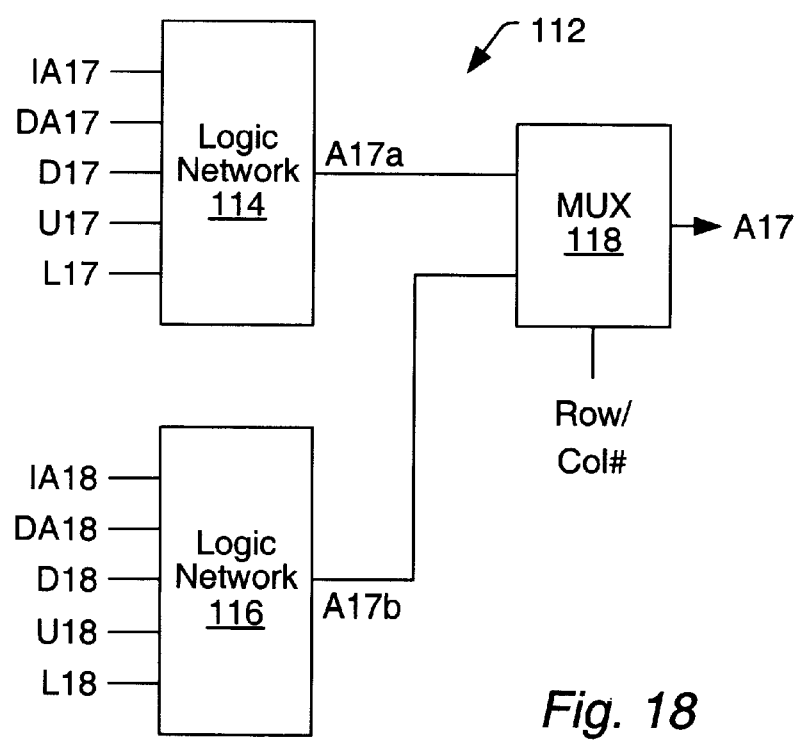
FIG. 18 is a block diagram of an example logic system which may be embodied within ASG 82 of FIG. 12 in order to generate address signal A17.

The logic required to generate address signals A15–A21 is much more complex. FIG. 18 is a block diagram of an example logic system 112 which may be embodied within ASG 82 of MCU 66 in order to generate (for the example used) address signal A17. Logic system 112 includes a first logic network 114 producing an output signal A17*a*, a second logic network 116 producing an output signal A17*b*, and a MUX 118 producing output signal A17 by selecting between signals A17*a* and A17*b* depending upon the value of the ROW/COL# signal. First logic network 114 has data input signals including IA17 generated by BIU 14, DA17 generated by DMA unit 64, D17 which is address bit AB17 within DSMB register 78 (DMA source read) or DDMB register 80 (DMA destination write), U17 which is address bit AB17 within UMB register 74, and L17 which is address bit AB17 within LMB register 76. First logic network 114 produces output signal A17*a* in accordance with the following pseudo code:

```
if(DMA memory access) {
    if(DMA source read) {
        if(DSMB[AB17] enabled) /* memory banking enabled */
            A17a = DSMB[AB17]; /* use register address bit value */
        else /* memory banking disabled */
            A17a = DA17; /* use value provided by DMA unit */
    }
    else { /* DMA destination write */
        if(DDMB[AB17] enabled) /* memory banking enabled */
            A17a = DDMB[AB17]; /* use register address bit value */
        else /* memory banking disabled */
            A17a = DA17; /* use value provided by DMA unit */
    }
}
else if(UCS1# asserted)
{ /* address in uppermost portion of memory space */
    if(UMB[AB17] enabled) { /* memory banking enabled */
        if(UCS0# asserted) /* address in reserved section */
            A17a = 1; /* set to predetermined value */
        else
            A17a = UMB[AB17]; /* use register address bit value */
    }
    else /* memory banking disabled */
        A17a = IA17; /* use value provided by BIU */
}
else if(LCS1# asserted)
{ /* address in lowermost portion of memory space */
    if(LMB[AB17] enabled) { /* memory banking enabled */
        if(LCS0# asserted) /* address in reserved section */
            A17a = 0; /* set to predetermined value */
        else
            A17a = LMB[AB17]; /* use register address bit value */
    }
    else /* memory banking disabled */
        A17a = IA17; /* use value provided by BIU */
}
else
    A17a = IA17; /* default */
```

Second logic network 116 has data input signals including IA18 generated by BIU 14, DA18 generated by DMA unit 64, D18 which is address bit AB18 within DSMB register 78 (DMA source read) or DDMB register 80 (DMA destination write), U18 which is address bit AB18 within UMB register 74, and L18 which is address bit AB18 within LMB register 76. Second logic network 116 produces output signal A17*b* in accordance with the following pseudo code:

```
if(DMA memory access) {
    if(DMA source read) {
        if(DSMB[AB18] enabled) /* memory banking enabled */
            A17b = DSMB[AB18]; /* use register address bit value */
        else /* memory banking disabled */
            A17b = DA18; /* use value provided by DMA unit */
    }
    else {/* DMA destination write */
        if(DDMB[AB18] enabled) /* memory banking enabled */
            A17b = DDMB[AB18]; /* use register address bit value */
        else /* memory banking disabled */
            A17b = DA18; /* use value provided by DMA unit */
    }
}
else if(UCS1# asserted)
{ /* address in uppermost portion of memory space */
    if(UMB[AB18] enabled) { /* memory banking enabled */
        if(UCS0# asserted) /* address in reserved section */
            A17b = 1; /* set to predetermined value */
        else
            A17b = UMB[AB18]; /* use register address bit value */
    }
    else /* memory banking disabled */
        A17b = IA18; /* use value provided by BIU */
}
else if(LCS1# asserted)
{ /* address in lowermost portion of memory space */
    if(LMB[AB18] enabled) { /* memory banking enabled */
        if(LCS0# asserted) /* address in reserved section */
            A17b = 0; /* set to predetermined value */
        else
            A17b = LMB[AB18]; /* use register address bit value */
    }
    else /* memory banking disabled */
        A17b = IA18; /* use value provided by BIU */
}
else
    A17b = IA18; /* default */
```

If microcontroller 10*b* is coupled to an external non-DRAM device (e.g., an SRAM device or a Flash memory device), the value of the ROW/COL# signal remains a steady 1, and MUX 118 produces signal A17*a* as output signal A17. If, on the other hand, microcontroller 10*b* is coupled to an external DRAM device, the value of the ROW/COL# signal alternates during each memory access operation as described above. During the first portion of the memory access operation, the value of the ROW/COL# signal is a 1, and MUX 118 produces signal A17*a* as output signal A17. At the end of the first portion of the memory access operation, MCU 66 asserts the RAS# signal to store the address signals within the external DRAM device. During the second portion of the memory access operation, the value of the ROW/COL# signal is a 0, and MUX 118 produces signal A17*b* as output signal A17. At the end of the second portion of the memory access operation, MCU 66 asserts the CAS# signal to store the address signals within the external DRAM device. MCU 66 of microcontroller 10*b* thus generates address and control signals to access external memory devices including SRAM devices, DRAM devices, and Flash memory devices, and generates multiplexed address signals for DRAM devices such that DRAM devices of varying sizes are easily supported. When internal address signals are generated which correspond to a portion of the memory address space reserved for operating system software, MCU 66 generates address signals which provide memory banking capability such that a selected memory bank is always accessed. As a result, operating system software need only be present in the selected memory bank, allowing efficient utilization of external memory devices.

It will be appreciated by those skilled in the art having the benefit of this disclosure that this invention is believed to be a microcontroller which includes additional hardware which generates multiple auxiliary address signals needed to expand the memory address space of the microcontroller. When an address is generated within a portion of the memory address space reserved for operating system software, the additional hardware produces the auxiliary address signals such that a selected memory bank is always accessed. Furthermore, it is also to be understood that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. A device, comprising:

a bus interface unit configured to provide internal address signals for an execution unit to access one or more memory devices;

a direct memory access (DMA) unit configured to provide DMA address signals to access the one or more memory devices; and a memory control unit coupled to said bus interface unit and said DMA unit, wherein said memory control unit is configured to provide memory address signals to the one or more memory devices, said memory control unit comprising:

a first banking register configured to provide one or more first bank address signals for selecting one of a plurality of memory banks within the one or more memory devices; and an address generator configured to receive said internal address signals, said DMA address signals, and said first bank address signals;

wherein said address generator is configured to generate said memory address signals from said internal address signals and said first bank address signals for accesses to the one or more memory devices from the execution unit, and from said DMA address signals for accesses to the one or more memory devices from the DMA unit.

2. The device as recited in claim 1, wherein if said internal address signals indicate a reserved address space, said address generator is configured to generate said memory address signals to select a particular one of said memory banks regardless of said first bank address signals for access from the execution unit.

3. The device as recited in claim 2, further comprising a chip select unit configured to indicate to said address generator whether or not said internal address signals indicate a reserved address space.

4. The device as recited in claim 1, wherein said memory control unit further comprises a second banking register configured to provide one or more second bank address signals; wherein said address generator is configured to generate said memory address signals from said internal address signals and said first bank address signals if said internal address indicates a first address range, and from said internal address signals and said second bank address signals if said internal address indicates a second address range.

5. The device as recited in claim 4, wherein if said internal address signals indicate a reserved address space in said first address range, said address generator is configured to generate said memory address signals to select a particular one of said memory banks of said first address range regardless of said first bank address signals, and if said internal address signals indicate a reserved address space in said second address range, said address generator is configured to generate said memory address signals to select a particular one of said memory banks of said second address range regardless of said second bank address signals.

6. The device as recited in claim 1, wherein said memory control unit further comprises one or more DMA banking registers configured to provide one or more DMA bank address signals wherein said address generator is configured to generate said memory address signals from said DMA address signals and said DMA bank address signals for accesses to the one or more memory devices from the DMA unit.

7. The device as recited in claim 6, wherein said one or more DMA banking registers comprise a DMA source banking register for providing the DMA bank address signals for DMA read accesses and a DMA destination banking register for providing the DMA bank address signals for DMA write accesses.

8. The device as recited in claim 1, wherein said memory control unit is configured to provide memory address signals to the one or more memory devices as multiplexed memory address signals, wherein said memory control unit is configured to provide the even set of memory address signals during a first time period for a memory access and the odd set of memory address signals during a second time period for the memory access.

9. The device as recited in claim 1, wherein the device is a microcontroller.

10. A device, comprising:
    an execution unit configured to execute microprocessor instructions;
    a bus interface unit configured to provide internal address signals for the execution unit to access one or more memory devices;
    a memory control unit coupled to said bus interface unit, wherein said memory control unit is configured to provide memory address signals to the one or more memory devices, said memory control unit comprising:
        a first banking register configured to provide one or more first bank address signals for selecting one of a plurality of memory banks within the one or more memory devices; and
        an address generator configured to receive said internal address signals and said first bank address signals;
        wherein said address generator is configured to generate said memory address signals from said internal address signals and said first bank address signals for accesses to the one or more memory devices from the execution unit, wherein if said internal address signals indicate a reserved address space, said address generator is configured to generate said memory address signals to select a particular one of said memory banks regardless of said first bank address signals for access from the execution unit.

11. The device as recited in claim 10, further comprising a chip select unit configured to indicate to said address generator whether or not said internal address signals indicate a reserved address space.

12. The device as recited in claim 10, wherein said memory control unit further comprises a second banking register configured to provide one or more second bank address signals; wherein said address generator is configured to generate said memory address signals from said internal address signals and said first bank address signals if said internal address indicates a first address range, and from said internal address signals and said second bank address signals if said internal address indicates a second address range.

13. The device as recited in claim 12, wherein if said internal address signals indicate a reserved address space in said first address range, said address generator is configured to generate said memory address signals to select a particular one of said memory banks of said first address range regardless of said first bank address signals, and if said internal address signals indicate a reserved address space in said second address range, said address generator is configured to generate said memory address signals to select a particular one of said memory banks of said second address range regardless of said second bank address signals.

14. The device as recited in claim 10, further comprising:
    a direct memory access (DMA) unit configured to provide DMA address signals to access the one or more memory devices;
    wherein said memory control unit is further coupled to said DMA unit, wherein said address generator is further configured to receive said DMA address signals; and
    wherein said address generator is further configured to generate said memory address signals from said DMA address signals for accesses to the one or more memory devices from the DMA unit.

15. The device as recited in claim 14, wherein said memory control unit further comprises one or more DMA banking registers configured to provide one or more DMA bank address signals wherein said address generator is configured to generate said memory address signals from said DMA address signals and said DMA bank address signals for accesses to the one or more memory devices from the DMA unit.

16. The device as recited in claim 15, wherein said one or more DMA banking registers comprise a DMA source banking register for providing the DMA bank address signals for DMA read accesses and a DMA destination banking register for providing the DMA bank address signals for DMA write accesses.

17. The device as recited in claim 10, wherein said memory control unit is configured to provide memory address signals to the one or more memory devices as multiplexed memory address signals, wherein said memory control unit is configured to provide the even set of memory address signals during a first time period for a memory access and the odd set of memory address signals during a second time period for the memory access.

18. The device as recited in claim 10, wherein the device is a microcontroller.

19. A method for accessing one or more memory devices, comprising:
    generating internal address signals for execution unit accesses to the one or more memory devices;
    generating DMA address signals for DMA accesses to the one or more memory devices; and
    providing one or more first bank address signals for selecting one of a plurality of memory banks within the one or more memory devices;
    generating memory address signals for the one or more memory devices, wherein the memory address signals are generated from said internal address signals and said first bank address signals for execution unit accesses, and from said DMA address signals for DMA accesses.

20. The method as recited in claim 19, wherein said generating memory address signals comprises generating said memory address signals to select a particular one of said memory banks regardless of said first bank address signals for execution unit accesses if said internal address signals indicate a reserved address space.

21. The method as recited in claim 19, further comprising:

providing one or more second bank address signals; and wherein said generating memory address signals comprises generating said memory address signals from said internal address signals and said first bank address signals if said internal address indicates a first address range, and from said internal address signals and said second bank address signals if said internal address indicates a second address range.

22. The method as recited in claim 21, wherein if said internal address signals indicate a reserved address space in said first address range, said generating memory address signals comprises generating said memory address signals to select a particular one of said memory banks of said first address range regardless of said first bank address signals, and if said internal address signals indicate a reserved address space in said second address range, said generating memory address signals comprises generating said memory address signals to select a particular one of said memory banks of said second address range regardless of said second bank address signals.

23. The method as recited in claim 19, further comprising:

providing one or more DMA bank address signals; and wherein said generating memory address signals comprises generating said memory address signals from said DMA address signals and said DMA bank address signals for DMA accesses.

24. The method as recited in claim 23, wherein said providing one or more DMA bank address signals comprises providing DMA source bank address signals for DMA read accesses and DMA destination bank address signals for DMA write accesses.

25. The method as recited in claim 19, wherein said generating memory address signals comprises providing the even set of memory address signals to the one or more memory devices during a first time period for a memory access and the odd set of memory address signals during a second time period for the memory access.

* * * * *